United States Patent
Nakata et al.

(10) Patent No.: US 8,878,761 B2
(45) Date of Patent: Nov. 4, 2014

(54) LIQUID CRYSTAL DISPLAY DEVICE AND METHOD FOR DRIVING LIQUID CRYSTAL DISPLAY DEVICE

(75) Inventors: Jun Nakata, Osaka (JP); Ken Inada, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 342 days.

(21) Appl. No.: 13/502,986

(22) PCT Filed: Jun. 28, 2010

(86) PCT No.: PCT/JP2010/060992

§ 371 (c)(1),
(2), (4) Date: Apr. 19, 2012

(87) PCT Pub. No.: WO2011/048850

PCT Pub. Date: Apr. 28, 2011

(65) Prior Publication Data

US 2012/0206436 A1 Aug. 16, 2012

(30) Foreign Application Priority Data

Oct. 21, 2009 (JP) ................. 2009-242470

(51) Int. Cl.
*G09G 3/36* (2006.01)
*G02F 1/1343* (2006.01)

(52) U.S. Cl.
CPC ........ *G02F 1/134309* (2013.01); *G09G 3/3655* (2013.01); *G02F 2201/121* (2013.01); *G09G 3/3614* (2013.01); *G09G 2300/0426* (2013.01); *G09G 2300/0447* (2013.01); *G09G 2300/0465* (2013.01); *G09G 2300/0876* (2013.01); *G09G 2320/0219* (2013.01); *G09G 2320/028* (2013.01); *G09G 2330/021* (2013.01)
USPC ................. 345/95; 345/87; 345/92

(58) Field of Classification Search
CPC ......................................... G09G 3/3433–3/38
USPC ............................... 345/87, 92, 95
See application file for complete search history.

(56) References Cited

U.S. PATENT DOCUMENTS 6,515,646 B2 * 2/2003 Tokonami et al. .............. 345/96
8,310,427 B2 * 11/2012 Sheu .............................. 345/92
(Continued)

FOREIGN PATENT DOCUMENTS

JP 2-216121 8/1990
JP 5-53136 3/1993
(Continued)

OTHER PUBLICATIONS

International Search Report and Written Opinion mailed Nov. 22, 2010, directed to International Application No. PCT/JP2010/060992; 10 pages.

*Primary Examiner* — Adam J Snyder
*Assistant Examiner* — Roy Rabindranath
(74) *Attorney, Agent, or Firm* — Morrison & Foerster LLP

(57) ABSTRACT

An object of the present invention is to provide a liquid crystal display device capable of improving a viewing angle, while not decreasing an aperture ratio and preventing an increase in electricity consumption. A liquid crystal display device (1) of the present invention includes an active matrix substrate including a plurality of drain electrodes (14) disposed in a matrix form, a counter substrate including a plurality of common electrodes, and a liquid crystal layer being sandwiched between the active matrix substrate and the counter substrate, each of the plurality of drain electrodes (14) having formed (i) a subpixel (16a) part facing a first common electrode (11) among the plurality of common electrodes, across the liquid crystal layer, and (ii) a subpixel (16b) part facing a second common electrode (12) among the plurality of common electrodes, across the liquid crystal layer. To the first common electrode (11), a first common electrode voltage ($V_{C1}$) having a first center voltage ($V_{COMDC1}$) is applied, and to the second common electrode (12), a second common electrode voltage ($V_{C2}$) having a second center voltage ($V_{COMDC2}$) different from the first center voltage is applied. The present invention is suitably used for televisions and portable phones.

9 Claims, 12 Drawing Sheets

(56) References Cited

U.S. PATENT DOCUMENTS

| | | | |
|---|---|---|---|
| 8,362,989 B2* | 1/2013 | Tung et al. | 345/87 |
| 2003/0227429 A1 | 12/2003 | Shimoshikiryo | |
| 2006/0164352 A1 | 7/2006 | Yoo et al. | |
| 2006/0208984 A1 | 9/2006 | Kim et al. | |
| 2007/0046606 A1* | 3/2007 | Kim et al. | 345/90 |
| 2011/0115996 A1* | 5/2011 | Lin et al. | 349/34 |
| 2011/0193769 A1 | 8/2011 | Ohgami et al. | |

FOREIGN PATENT DOCUMENTS

| | | |
|---|---|---|
| JP | 8-15723 | 1/1996 |
| JP | 8-184854 | 7/1996 |
| JP | 2004-62146 | 2/2004 |
| JP | 2006-139288 | 6/2006 |
| JP | 2006-209135 | 8/2006 |

* cited by examiner

LIQUID CRYSTAL DISPLAY DEVICE AND METHOD FOR DRIVING LIQUID CRYSTAL DISPLAY DEVICE

REFERENCE TO RELATED APPLICATIONS

This application is the national stage under 35 USC 371 of International Application No. PCT/JP2010/060992, filed Jun. 28, 2010, which claims priority from Japanese Patent Application No. 2009-242470, filed Oct. 21, 2009, the entire contents of which are incorporated herein by reference.

FIELD OF THE INVENTION

The present invention relates to a liquid crystal display device and a driving method thereof.

BACKGROUND OF THE INVENTION

Liquid crystal display devices are used not only for large-sized television but also for small-sized display devices such as a display section of a portable phone, and the like. Although a liquid crystal display device of the conventionally used TN (Twisted Nematic) mode has a relatively narrow viewing angle, in recent years, liquid crystal display devices of a wide viewing angle are being produced, such as those in an IPS (In-Plane-Switching) mode and in a VA (Vertical Alignment) mode. Among such wide viewing angle modes, the VA mode is employed in many liquid crystal display devices, by its capability of achieving a high contrast ratio.

MVA (Multi-domain Vertical Alignment) mode is known as one type of the VA mode, which MVA mode forms a plurality of liquid crystal domains in one pixel area. In the liquid crystal display device of the MVA mode, an alignment controlling structure is provided on a side of at least one of a pair of substrates that face each other and have a vertical alignment liquid crystal layer be sandwiched between the substrates, on a side on which the liquid crystal layer is provided. The alignment controlling structure is, for example, a linear slit (opening) or rib (projecting structure) provided on an electrode. The alignment controlling structure causes application of an alignment controlling force from one or both sides of the liquid crystal layer, by which a plurality of liquid crystal domains (typically, four liquid crystal domains) having different alignment directions are formed, to achieve improvement in viewing angle characteristics.

A known disadvantage of the VA mode is that its display quality is remarkably different between the display quality from a front direction and the display quality from an oblique direction. In particular, with halftone display, when the displaying characteristics are adjusted to be appropriate when the display is seen from the front direction, the display characteristics such as color and gamma characteristic largely differ from those when the display is seen from the oblique direction. The optical axis direction of the liquid crystal molecules is in its molecule long-axis direction; during the halftone display, the optical axis direction of the liquid crystal molecule is angled to a certain degree with respect to a main surface of the substrate. If a viewing angle (direction from which the display is seen) is changed in this state and the display image is viewed from a direction parallel to the optical axis direction of the liquid crystal molecule, that is, if the display image is viewed from the oblique direction, the display characteristics would differ largely from the display characteristics of when the display image is viewed from the front direction.

More specifically, the display image viewed from the oblique direction looks whitish as a whole as compared to when the display image is viewed from the front direction. Such a phenomenon is called "excess brightness". For example, in a case in which a human face is displayed, from the front direction, face expressions and the like of the human face is viewable without discomfort, whereas from the oblique direction, the face may look whitish as a whole, and subtle tone expressions of the skin may be viewed white out.

In order to improve such excess brightness, one pixel electrode is divided into a plurality of (typically, two) subpixel electrodes, to provide a plurality of (typically, two) subpixels in one pixel by having different electric potentials between the subpixel electrodes. With such a liquid crystal display device, tone characteristics of a subpixel is adjusted so that the display is not reduced in quality when viewed from the oblique direction as compared to the display quality when viewed from the front direction (see for example, Patent Literatures 1 to 3).

In the liquid crystal display device disclosed in Patent Literature 1, two subpixel electrodes are connected to different source wires via different switching elements, and are driven so that the electric potential of the two subpixel electrodes differ from each other. Such difference in the electric potential between the subpixel electrodes causes a difference in the voltages applied to the liquid crystal layer of the subpixels. As a result, the subpixels have different transmissivities, thereby allowing for achieving improvement in the excess brightness.

In the liquid crystal display device disclosed in Patent Literature 2, two subpixel electrodes correspond to different switching elements, and these switching elements are connected to different gate wires. The liquid crystal display device of Patent Literature 2 is driven so that the two subpixel electrodes have different electric potentials, by having a time in which the two gate wires are switched on differ at least partially.

Moreover, a liquid crystal display device disclosed in Patent Literature 3 includes, in addition to the two subpixel electrodes, storage capacitor wires corresponding to the subpixel electrodes, respectively, which storage capacitor wires directly or indirectly form a storage capacitor with their respective subpixel electrode. By having a different CS voltage be applied to the storage capacitor wire, the effective voltage applied to the liquid crystal layer changes. In the liquid crystal display device of Patent Literature 3, improvement in the excess brightness is achieved as such.

Japanese Patent Application Publication, Tokukai, No. 2006-209135 A (Publication Date: Aug. 10, 2006)

Japanese Patent Application Publication, Tokukai, No. 2006-139288 A (Publication Date: Jun. 1, 2006)

Japanese Patent Application Publication, Tokukai, No. 2004-62146 A (Publication Date: Feb. 26, 2004)

SUMMARY OF INVENTION

However, with the liquid crystal display device of Patent Literature 1, two source wires are necessarily provided for each pixel column, which causes an increase in the number of source wires. Moreover, the liquid crystal display device of Patent Literature 2 requires providing two gate wires for each row of pixels, which causes an increase in the number of gate wires. Furthermore, the liquid crystal display device of Patent Literatures 1 and 2 require providing a TFT for each subpixel electrode. Hence, with the liquid crystal display device of Patent Literatures 1 and 2, the aperture ratio of the display area decreases.

Moreover, in the liquid crystal display device of Patent Literature 3, the voltages applied to the liquid crystal layer of the subpixels are not as different as that of the CS voltages. In particular, in a case in which the TFT gate-drain capacity is large, the difference in the effective voltages applied to the liquid crystal layer of the subpixels does not increase in difference even if the CS voltages differ, and the difference in transmissivities of the subpixels is not made sufficiently great. In this case, sufficiently adjusting tone characteristics of the subpixel causes an increase in the electricity consumption. Hence, it is not possible to efficiently improve the excess brightness.

The present invention is accomplished in view of the problems, and an object thereof is to provide a liquid crystal display device that can be improved in viewing angle characteristics without causing an aperture ratio thereof to decrease and without increasing the power consumption.

In order to attain the object, a liquid crystal display device according to the present invention includes: an active matrix substrate including a plurality of pixel electrodes that are disposed in a matrix form; a counter substrate including a plurality of common electrodes; and a liquid crystal layer being sandwiched between the active matrix substrate and the counter substrate, each of the plurality of pixel electrodes facing at least two common electrodes, one common electrode of the at least two common electrodes facing the respective pixel electrode serving as a first common electrode and another common electrode other than the first common electrode serving as a second common electrode, the liquid crystal display device further including: first common electrode voltage application means for applying, to the first common electrode, a first common electrode voltage that includes a center voltage as a first center voltage, the center voltage being the voltage thus applied in a case of DC drive and being a value in midpoint of an amplitude of the voltage thus applied in a case of AC drive; and second common electrode voltage application means for applying, to the second common electrode, a second common electrode voltage that includes a second center voltage, the second center voltage being the center voltage of a different value from that of the first center voltage.

According to the configuration, each pixel electrode includes, at least, a first area which faces a first common electrode across a liquid crystal layer, and a second area which faces a second common electrode across the liquid crystal layer. When the liquid crystal display device is driven, a first common electrode voltage is applied to the first common electrode, and a second common electrode voltage is applied to the second common electrode. At this time, the first common electrode voltage has a center voltage different from a center voltage of the second common electrode voltage. Accordingly, it is possible to have the voltage applied to the liquid crystal layer in the first area, i.e. the liquid crystal layer sandwiched between the first area of the pixel electrode and the first common electrode be different from the voltage applied on the liquid crystal layer of the second area, i.e. the liquid crystal layer sandwiched between the second area of the pixel electrode and the second common electrode.

This allows for dividing a pixel electrode into a plurality of subpixel electrodes and forming a plurality of areas having different transmissivities within one pixel, without providing a switching element such as a TFT to each of the subpixel electrodes. Hence, it is possible to minimize the decrease in aperture ratio that is apparent in the conventional technique, which decrease is caused by a separately provided switching element.

Moreover, V-T characteristic of the liquid crystal display device is a characteristic based on an average of the transmissivities of the areas in the pixel, which transmissivities are different for each area. Hence, it is possible to improve the display quality of the liquid crystal display device when the display screen is viewed from an oblique direction in the halftone. Namely, it is possible to improve the viewing angle characteristics of the liquid crystal display device.

Furthermore, in particular, the present invention has the first center voltage included in the first common electrode voltage be different from the second center voltage included in the second common electrode voltage. This difference in the center voltages of the common electrode voltages causes a difference between a voltage applied to the liquid crystal layer in the first area and a voltage applied to the liquid crystal layer in the second area, which difference in the voltages applied to the liquid crystal layer in the first area and in the second area caused by the difference in the center voltages is larger than a difference between the voltage applied to the liquid crystal layer between those areas caused by having a difference in amplitudes of the common electrode voltages that are driven by an alternating current while having a common center voltage.

When a plurality of areas having different transmissivities are formed within one pixel, the greater the difference in the voltage applied to the liquid crystal layer between each of the areas, the greater the improvement effect is of the viewing angle characteristics. Hence, according to the present invention in which the difference in the voltage applied to the liquid crystal layer between the areas is made greater, it is possible to provide a liquid crystal display device that has a more excellent viewing angle characteristic.

Moreover, in order to generate a difference between the voltages applied to the liquid crystal layer in each of the areas, it is only necessary to have the first center voltage included in the first common electrode voltage be different from the second center voltage of the second common electrode voltage. Hence, the electricity consumption can be reduced as compared to a case in which magnitudes of amplitudes in the common electrode voltages that are driven by an alternating current are made different to generate the difference between the applied voltages.

Hence, according to the configuration, it is possible to provide a liquid crystal display device that can improve the viewing angle while preventing a reduction in the aperture ratio and preventing an increase in the electricity consumption.

In order to attain the object, a method according to the present invention of driving a liquid crystal display device is a method of driving a liquid crystal display device, the liquid crystal display device including (i) an active matrix substrate including a plurality of pixel electrodes that are disposed in a matrix form, (ii) a counter substrate including a plurality of common electrodes, and (iii) a liquid crystal layer being sandwiched between the active matrix substrate and the counter substrate, each of the plurality of pixel electrodes having formed an area in which the pixel electrode faces a respective first common electrode among the plurality of common electrodes, across the liquid crystal layer, and an area in which the pixel electrode faces a respective second common electrode among the plurality of common electrodes, across the liquid crystal layer, the method including: applying, to the first common electrode, a first common electrode voltage that includes a center voltage as a first center voltage, the center voltage being the voltage thus applied in a case of DC drive and being a value in midpoint of an amplitude of the voltage thus applied in a case of AC drive; and applying, to the second common electrode, a second common electrode voltage that includes a second center voltage, the second center voltage being the center voltage of a different value from that of the first center voltage.

With the foregoing configuration, a similar effect as the foregoing liquid crystal display device is brought about, thus being possible to accomplish driving of a liquid crystal display device that can improve the viewing angle while preventing the decrease in aperture ratio and preventing the increase in electricity consumption.

As described above, the liquid crystal display device according to the present invention has a plurality of common electrodes formed on a counter substrate. Since common electrode voltages having different center voltages are applied to the common electrodes, a plurality of areas in which different voltages are applied to the liquid crystal layer are formed within one pixel. This brings about an effect of attaining a liquid crystal display device whose viewing angle characteristics are improved, while preventing a decrease in the aperture ratio and preventing an increase in the amount of electricity consumption.

DETAILED DESCRIPTION OF THE INVENTION

Described below is one embodiment of a liquid crystal display device according to the present invention, with reference to FIGS. 1 through 5 and FIGS. 9 and 10.

The liquid crystal display device according to the present invention includes an active matrix substrate including a plurality of drain electrodes (pixel electrodes), a counter substrate including a first common electrode (first common electrode) and a second common electrode (second common electrode), and a liquid crystal layer sandwiched between the active matrix substrate and the counter substrate.

Figure 9:
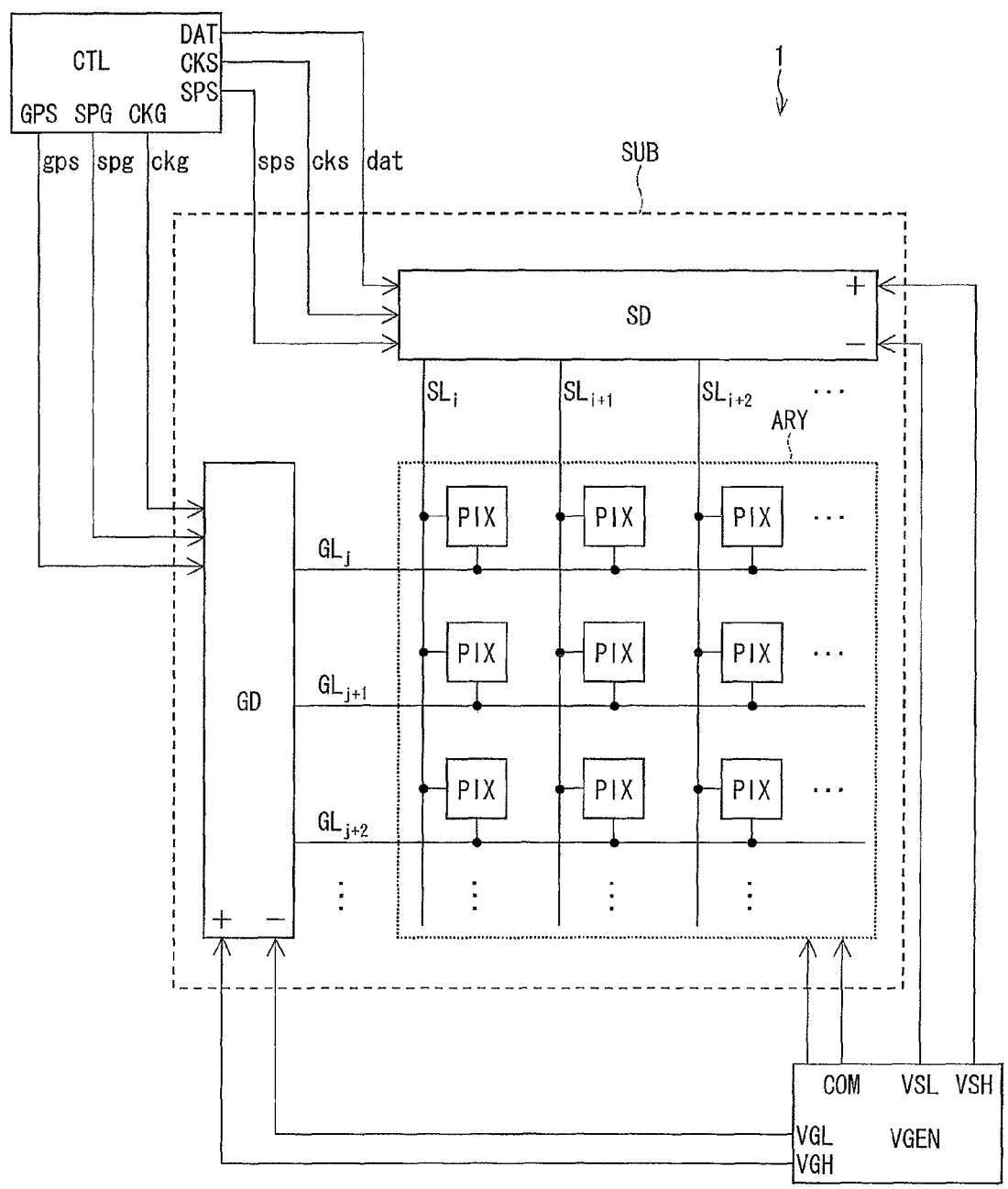
FIG. 9 is a block diagram schematically illustrating a liquid crystal display device of the present invention.

FIG. 9 is a schematic block diagram illustrating a liquid crystal display device of an active matrix drive, according to the present embodiment.

The liquid crystal display device 1 includes a pixel array ARY, a scanning signal line drive circuit GD and a data signal line drive circuit SD (see FIG. 9). The pixel array ARY has pixels PIX disposed in a matrix form in the vicinity of intersections of a multiple number of scanning signal lines GL intersecting with a multiple number of data signal lines SL. Each of the pixels PIX is connected to an adjacent scanning signal line GL and an adjacent data signal line SL.

The liquid crystal display device 1 is of a so-called driver monolithic structure, in which the pixel array ARY, the data signal line drive circuit SD, and the scanning signal line drive circuit GD are formed on a same substrate SUB, and is driven according to a video signal dat, a clock signal cks, a start signal sps, a clock signal ckg, a start signal spg, and a pulse width control signal gps, each of which are supplied from the external control circuit CTL, and various driving power sources from the external power source circuit VGEN.

The data signal line drive circuit SD synchronizes with a timing signal such as the clock signal cks and the like to sample the supplied video signal dat. This sampled video signal data is amplified if necessary and is written into the data signal line SL. The scanning signal line drive circuit GD synchronizes with a timing signal such as the clock signal ckg and the like, successively selects the scanning signal lines GL, and controls the opening and closing of the switching element inside the pixel PIX, to write in the video signal (data) dat written into the data signal lines SL into a corresponding pixel PIX, and stores the data written into each of the pixels PIX.

The pixel PIX, although not illustrated, usually includes a field effect transistor serving as a switching element, and a pixel capacitor made up of a liquid crystal capacitor and a storage capacitor (added if necessary). One of electrodes of the pixel capacitor is connected to the data signal line SL via a drain and source of the transistor, while the gate of the transistor is connected to the scanning signal line GL. Meanwhile, the other electrode of the pixel capacitor is connected to a common electrode shared by all pixels. A common electrode voltage applied to the common electrode is generated by a common electrode voltage application circuit (first common electrode voltage application means, second common electrode voltage application means) provided within an external power source circuit VGEN.

Each of the pixels PIX have a parasitic capacitor Cgd (not illustrated) formed between a corresponding scanning signal line GL and the drain electrode of the pixel PIX later described.

Described below are details of the common electrode, with reference to FIG. 2.

Figure 2:
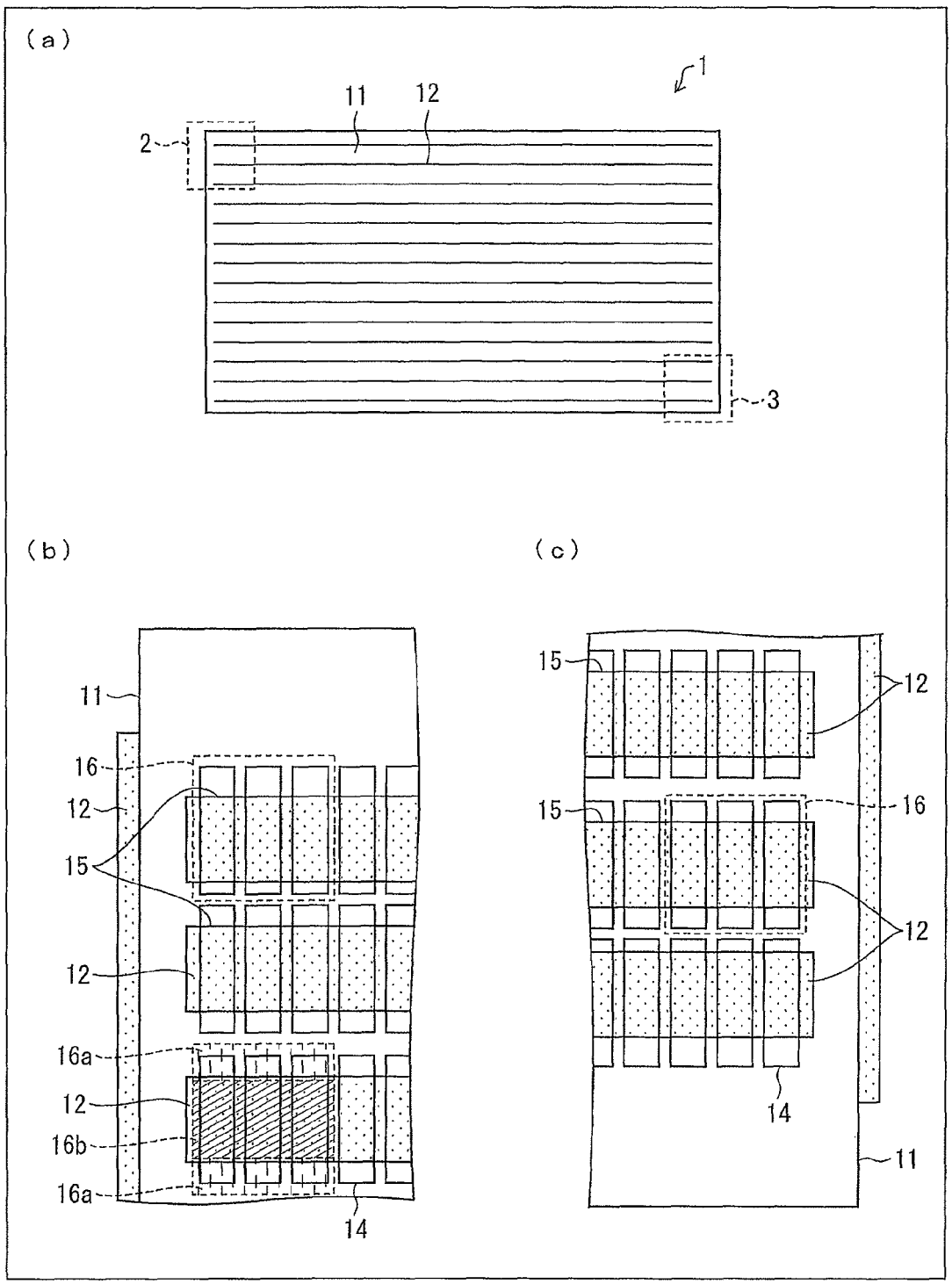
FIG. 2 is a plan view illustrating an electrode configuration of a liquid crystal display device in an embodiment of the present invention; (a) illustrates the liquid crystal display device in its entirety, (b) illustrates a partial enlargement of (a), and (c) illustrates a partial enlargement of (a).

FIG. 2 is a view illustrating a configuration of an electrode in the liquid crystal display device of the present embodiment. FIG. 2 is a plan view illustrating configurations of a first common electrode 11 and a second common electrode 12 of the liquid crystal display device 1 of the present embodiment. Illustrated in (a) of FIG. 2 is an overview of the entire liquid crystal display device 1, and (b) of FIG. 2 and (c) of FIG. 2 each illustrate in an enlarged manner a part surrounded by the broken line borders 2 and 3 in (a) of FIG. 2, respectively. In (b) of FIG. 2 and (c) of FIG. 2, configurations other than the first common electrode 11, the second common electrode 12, and drain electrodes 14 have been omitted in illustration, and illustrated are the drain electrodes 14 and the pixels 16 (pixel PIX) that are demarcated by the drain electrodes 14, in a superimposed manner on the counter substrate.

As illustrated in (a) in FIG. 2, the first common electrode 11 and the second common electrode 12 extend linearly in the row direction alternately in the display area of the liquid crystal display device 1.

As shown in (b) of FIG. 2 and (c) of FIG. 2, the first common electrode 11 and the second common electrode 12 of the counter substrate are formed so that the first common electrode 11 is formed entirely on a transparent substrate of the counter substrate, and openings 15 are formed extending linearly in the row direction, in which openings the second common electrode 12 is formed. Hence, the counter substrate has the linear first common electrode 11 and the linear second common electrode 12 be aligned alternately to each other.

Such first common electrode 11 and second common electrode 12 may be formed by a method described as follows for example. First, a second common electrode 12 is formed on the entire surface of the transparent substrate. Thereafter, a first common electrode 11 that is opened partially is formed on the second common electrode 12. This forms a configuration in which the second common electrode 12 is formed in the openings of the first common electrode 11. In this case, it is necessary to provide an insulating layer between the two electrodes. As a result, it is possible to have an increased aperture ratio than the foregoing forming method.

Moreover, another possible mode of the first common electrode 11 and the second common electrode 12 is a configuration in which the first common electrode 11 and the second common electrode 12 physically separated from each other are disposed alternately on a same layer on the counter substrate. Such a first common electrode 11 and second common electrode 12 can be formed by a method as described below, for example. An electrode film is formed on an entire surface of the counter substrate on which the electrode is to be formed, and this electrode film is separated into two by etching, to form the first common electrode 11 and the second common electrode. According to the configuration, there is no need to provide an insulating layer between the first common electrode 11 and the second common electrode 12. Since no process of providing an insulating layer between the two electrodes is necessary, this method is advantageous in terms of processing.

The first common electrode 11 and the second common electrode 12 are electrically independent from each other, and as described later, are applied with different common electrode voltages, respectively. In the present specification, the first common electrode signal supplied to the first common electrode 11 and the second common electrode signal supplied to the second common electrode 12 are generated in the common electrode voltage application circuit within the external power source circuit VGEN (FIG. 9) as described above, and the first common electrode signal and the second common electrode signal are supplied to the liquid crystal display device 1 via two common electrode terminals. Alternatively, each of the first and second common electrode signals may be generated by an external circuit of the liquid crystal display device 1.

The active matrix substrate arranges a plurality of drain electrodes 14 thereon, and one pixel 16 is formed by having three of the drain electrodes 14 serve as one set. The three drain electrodes 14 are electrodes corresponding to R (red), G (green), and B (blue) pixels, respectively. In the liquid crystal display device 1, a plurality of the pixel 16 are arranged in matrix form of a plurality of rows and a plurality of columns.

Each of the pixels 16 is divided into a subpixel 16a part (part hatched with broken lines in a vertical direction, in (b) of FIG. 2) and a subpixel 16b part (part hatched with oblique lines, in (b) of FIG. 2). The subpixel 16a part is a part in the pixels 16 that face the first common electrode 11 across the liquid crystal layer, and the subpixel 16b part is a part in the pixels 16 that face the second common electrode 12 across the liquid crystal layer. Hence, positions and size of the subpixel 16a and the subpixel 16b are fixed depending on the positions and size of the first common electrodes 11 and second common electrodes 12, respectively.

Figure 3:
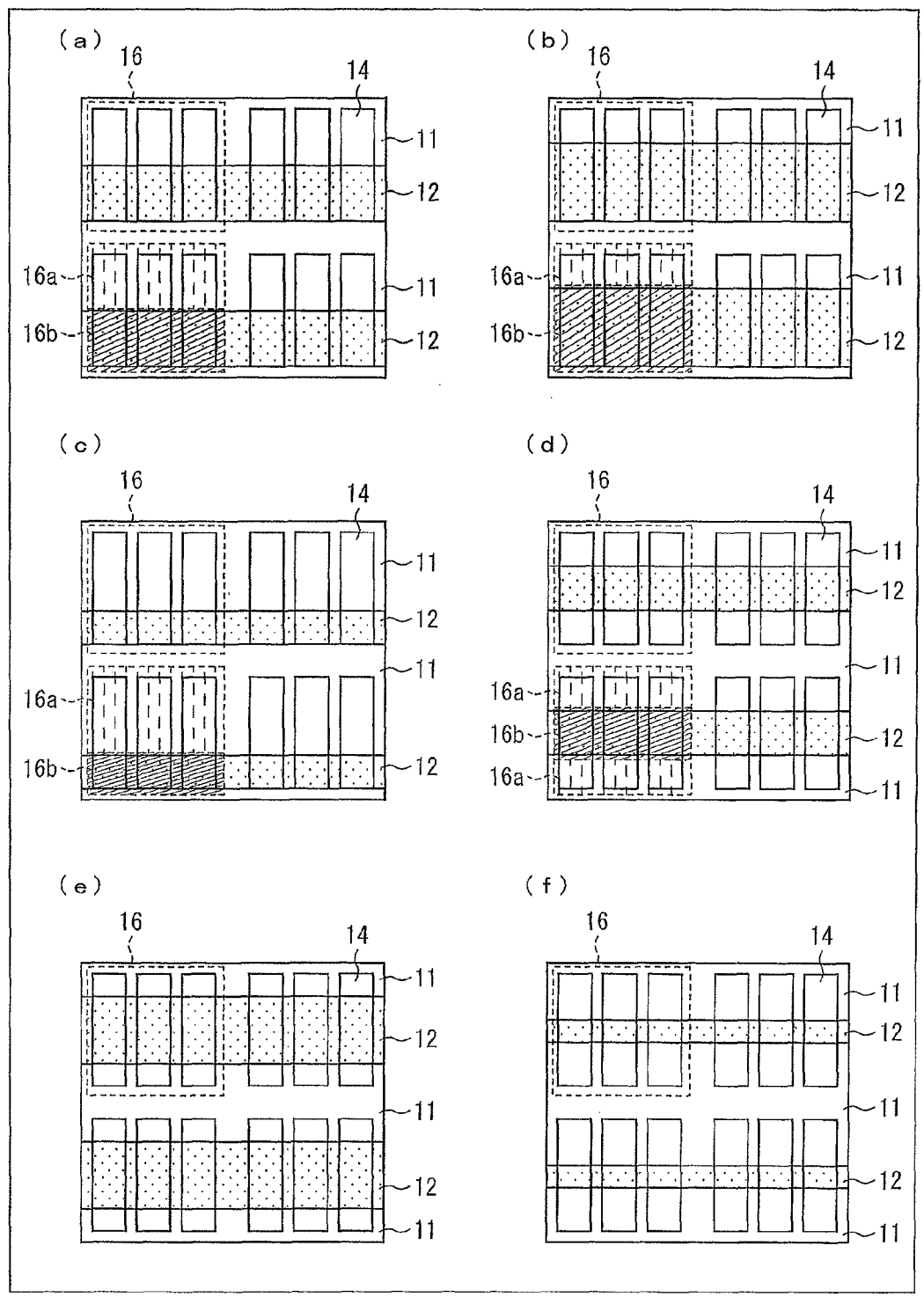
FIG. 3 is a view illustrating examples of configurations of common electrodes in the liquid crystal display device according to the present invention.

FIG. 3 is a view illustrating examples of patterns of the first common electrodes 11 and the second common electrodes 12. As illustrated in (a) of FIG. 3, the second common electrodes 12 may be formed so that the size of the subpixel 16a part and the size of the subpixel 16b part are almost the same size in the pixels 16. Alternatively, as illustrated in (b) of FIG. 3, the first common electrodes 11 and the second common electrodes 12 may be formed so that the subpixel 16b part is larger than the subpixel 16a part, or vice versa, the first common electrodes 11 and the second common electrodes 12 may be formed so that the subpixel 16a part is larger than the subpixel 16b part, as illustrated in (c) of FIG. 3. Furthermore, as illustrated in (d) through (f) of FIG. 3, the first common electrode 11 and the second common electrode 12 may be formed so that one of the subpixels is divided within one pixel 16. Although the subpixel 16a part is divided into two upper and lower parts in the pixel 16 by the subpixel 16b part in (d) through (f) of FIG. 3, the first common electrode 11 and second common electrode 12 can be formed so that the subpixel 16b part is divided by the subpixel 16a part. Moreover, even in cases as illustrated in (d) through (f) of FIG. 3, the size and the like of the subpixels are not particularly limited.

Figure 4:
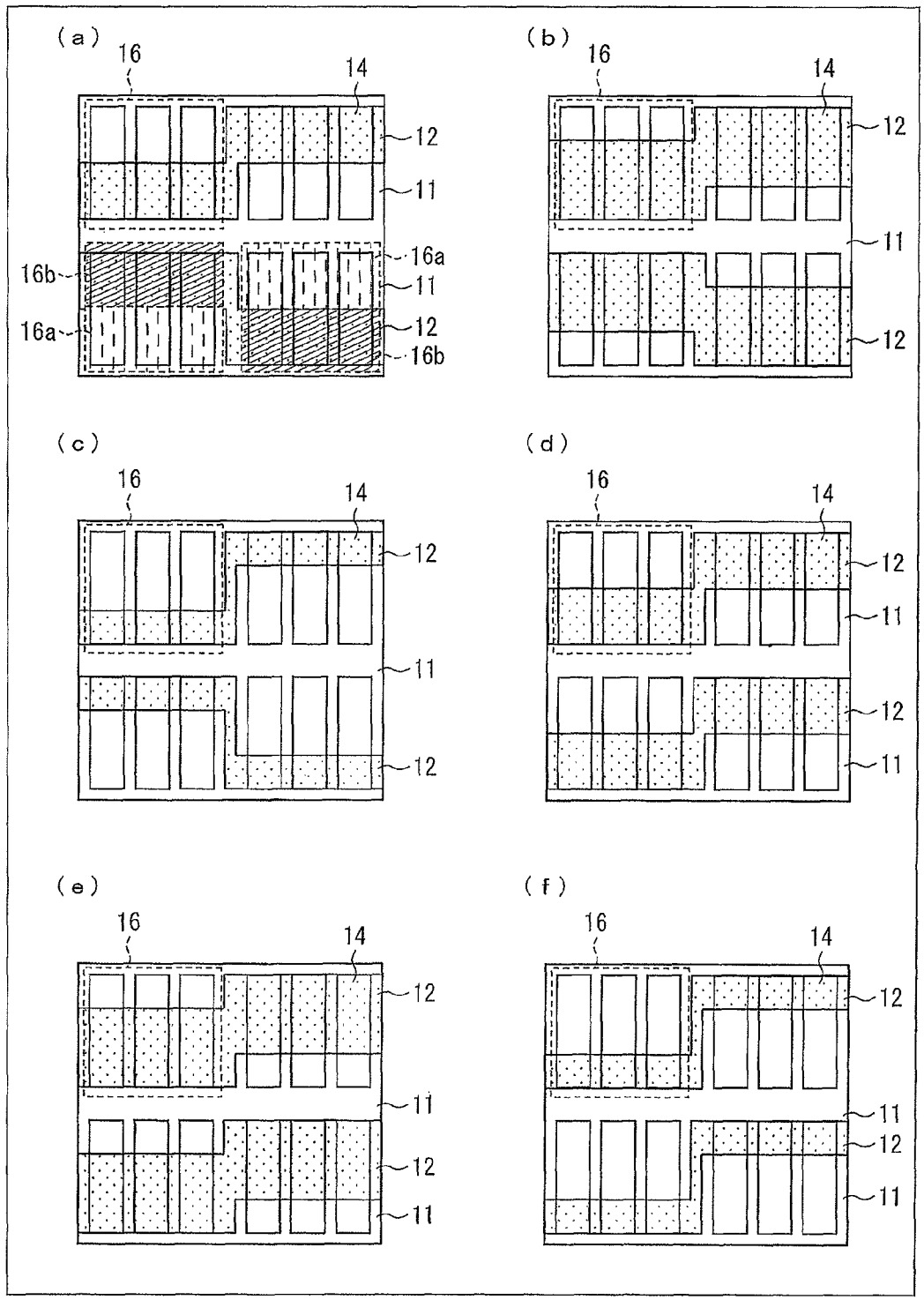
FIG. 4 is a view illustrating further other examples of configurations of the common electrodes in the liquid crystal display device according to the present invention.

FIG. 4 illustrates further other examples of patterns of the first common electrode 11 and the second common electrode 12. In the example illustrated in FIG. 3, each of the first common electrode 11 and the second common electrode 12 are formed so as to extend in a straight line in a row direction in a single row, however as illustrated in FIG. 4, each of the first common electrode 11 and second common electrode 12 can be of a rectangular wave-shaped structure.

The liquid crystal display device 1 illustrated in (a) through (f) of FIG. 4 has the first common electrodes 11 and the second common electrodes 12 be formed in such a manner that in a pixel 16, the subpixel 16a part is formed in an upper part of the pixel 16 and the subpixel 16b part is formed in a lower part of the pixel 16, and in a pixel 16 adjacent in the same row of this pixel 16, the subpixel 16a part is formed in a lower part of the pixel 16 and the subpixel 16b part is formed in an upper part of the pixel 16.

By having the counter substrate have the foregoing configuration, it is possible to form a plurality of subpixels in which different voltages are applied to its liquid crystal layer, in each of the plurality of pixels 16.

In a case in which the pixel electrode has an electric potential higher than an electric potential of the common electrode, when the electric potential of the common electrode signal changes by +1 V, a voltage applied to the liquid crystal layer changes by −1 V, and a rising voltage in a V-T curve changes by +1 V. On the contrary, when the electric potential of the common electrode signal changes by −1 V, the voltage applied to the liquid crystal layer changes by +1 V, and the rising voltage in the V-T curve changes by −1 V. Hence, by having areas of different electric potentials of the common electrodes be provided within one pixel, a plurality of areas exhibiting characteristics with respect to electric potentials different from each other in a common V-T curve are formed within one pixel. Namely, a plurality of areas having different transmissivities from each other are formed. This as a result allows for improving excess brightness.

In the liquid crystal display device 1 according to the present invention, a first common electrode voltage $V_{C1}$ is applied to the first common electrode 11, and a second common electrode voltage $V_{C2}$ is applied to the second common electrode 12 independently of the first common electrode voltage $V_{C1}$. The electric potentials of the subpixel 16a part and the subpixel 16b part of the drain electrode 14 are equivalent to each other. Accordingly, a voltage $V_{LC1}$ applied to the liquid crystal layer between the subpixel 16a part of the drain electrode 14 and the first common electrode 11 (liquid crystal layer of the subpixel 16a) is different from a voltage $V_{LC2}$ applied to the liquid crystal layer between the subpixel 16b part of the drain electrode 14 and the second common electrode 12 (liquid crystal layer of the subpixel 16b).

In this case, as the difference between the voltage $V_{LC1}$ applied to the liquid crystal layer of the subpixel 16a and the voltage $V_{LC2}$ applied to the liquid crystal layer of the subpixel 16b increases, the viewing angle improvement effect increases in degree. Described below is two ways of achieving such a difference: (i) a case in which the voltage $V_{LC1}$ applied to the liquid crystal layer of the subpixel 16a is made different from the voltage $V_{LC2}$ applied to the liquid crystal layer of the subpixel 16b by having each of the common electrode voltages be driven by AC to generate a difference in their amplitudes, while the center voltage of the first common electrode voltage $V_{C1}$ and the center voltage of the second common electrode voltage $V_{C2}$ are made in common; and (ii) a case in which the voltage $V_{LC1}$ applied to the liquid crystal layer of the subpixel 16a is made different from the voltage $V_{LC2}$ applied to the liquid crystal layer of the subpixel 16b by having the center voltage of the first common electrode voltage $V_{C1}$ be different from the center voltage of the second common electrode voltage $V_{C2}$.

Figure 5:
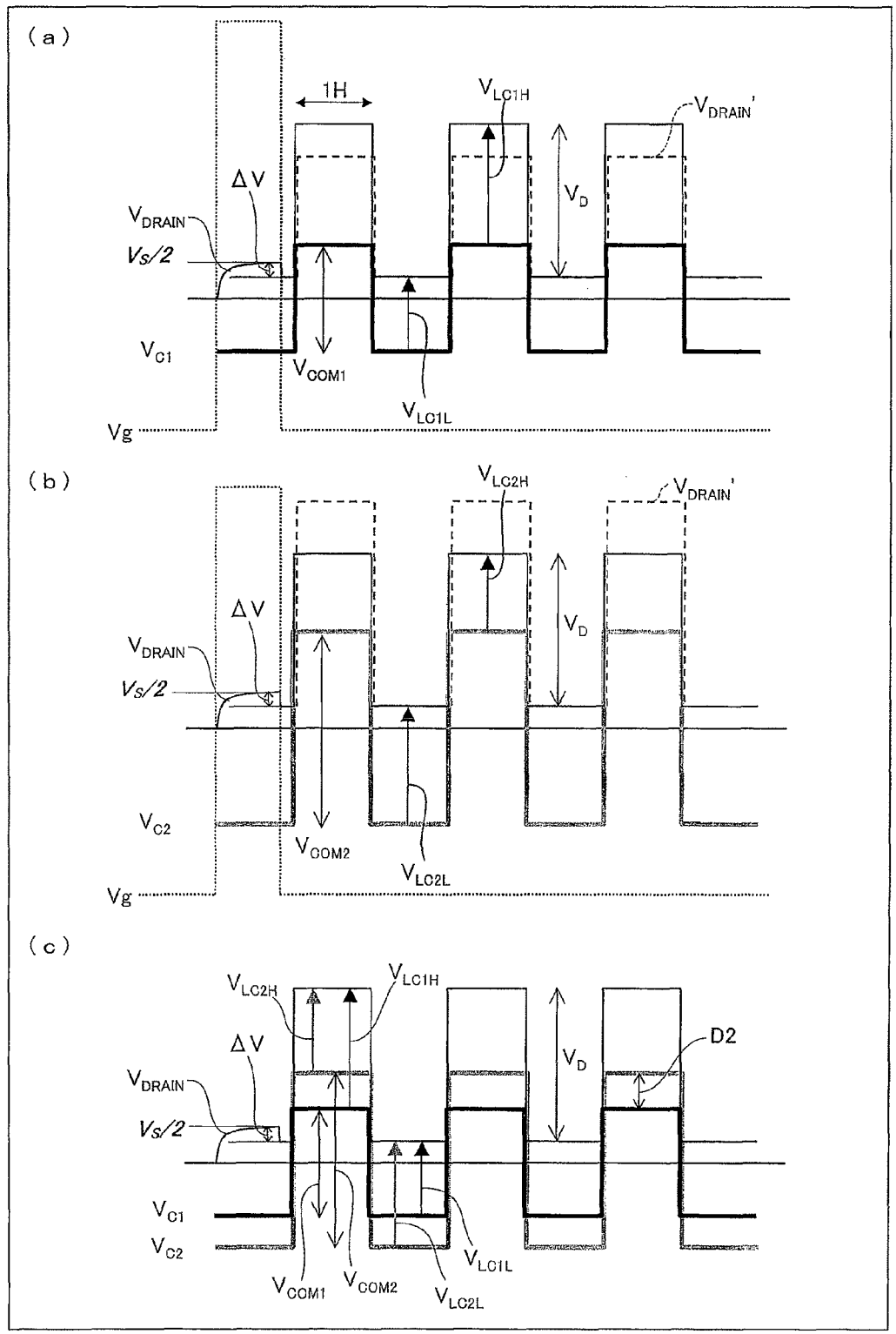
FIG. 5 is a timing chart of voltages in a case in which common electrodes have a common center voltage; (a) and (b) show timing charts of signals in different common electrodes, respectively, and (c) shows the signals in (a) and (b) in a superimposed manner.

First, the case of (i) is described below with reference to FIG. 5, i.e., of a driving method of applying different voltages to the liquid crystal layer of the subpixel 16a and the liquid crystal layer of the subpixel 16b, when the center voltage of the first common electrode voltage $V_{C1}$ is in common with the center voltage of the second common electrode voltage $V_{C2}$. Illustrated in (a) of FIG. 5 is a behavior of the voltages in the subpixel 16a, and (b) of FIG. 5 illustrates a behavior of the voltages in the subpixel 16b. Moreover, (c) of FIG. 5 superimposes the signals of the voltages in (a) and (b) of FIG. 5.

In order to avoid the description from becoming excessively complex, a signal input that makes all pixels be in a same gray scale level is inputted in the present specification.

Each of the pixels PIX have the parasitic capacitor Cgd described above. Consequently, each of the subpixels 16a and 16b also has the parasitic capacitor Cgd formed between the scanning signal lines GL and the drain electrodes 14. Hence, after a drain voltage $V_S/2$ is written into the drain electrode 14 in a state in which a gate voltage Vg is made High, the voltage of the drain electrode 14 decreases by ΔV via the parasitic capacitor Cgd at a timing in which the gate voltage is made Low. With a liquid crystal display device driven by AC in which a data signal is supplied having its polarity be changed every frame, such a phenomenon (feed-through phenomenon) occurs in both periods in which the data signal has a positive polarity and in which the data signal has a negative polarity.

In the common electrode signal illustrated in (a) and (b) of FIG. 5, the first common electrode voltage $V_{C1}$ and the second common electrode voltage $V_{C2}$ are voltages for AC drive, which change every one horizontal scanning period (1H period), and whose center voltages are in common. So that the voltage $V_{LC1}$ applied to the liquid crystal layer of the subpixel 16a is made different from the voltage $V_{LC2}$ applied to the liquid crystal layer of the subpixel 16b, an amplitude $V_{COM1}/2$ of the first common electrode voltage $V_{C1}$ is made different from an amplitude $V_{COM2}/2$ of the second common electrode voltage $V_{C2}$. In the embodiment, the amplitude $V_{COM2}/2$ is set larger than $V_{COM1}/2$. Moreover, $V_S/2$ is applied to the drain electrode 14 as a drain voltage $V_{DRAIN}$. The drain voltage $V_{DRAIN}$ is affected by the first common electrode 11 and second common electrode 12 that face the drain electrode 14 across the liquid crystal layer, during a period other than a write-in timing of the drain electrode 14. Namely, the data signal voltage is caused to change by being effected by a change in the common electrode voltages. As a result, the data signal voltage changes by $V_D$ per 1H period, linked together with the behavior of the common electrode voltages.

Alternatively, the $V_D$ which is the amplitude of the drain voltage $V_{DRAIN}$ may be controlled by providing a storage capacitor Ccs and changing the amplitude of a voltage applied to a storage capacitor electrode CS. Controlling of the $V_D$ is described later. By changing the storage capacitor voltage to cause $V_D$ to change, so that the magnitude of $V_D$ and the magnitudes of the amplitudes $V_{COM1}$ and $V_{COM2}$ be the same, a voltage applied of the first common electrode voltage $V_{C1}$ and the second common electrode voltage $V_{C2}$ become constant in a High timing and a Low timing.

The drain voltage $V_{DRAIN}$ is driven inversely in order to prevent image sticking on the liquid crystal layer. However, since the magnitude of the voltage applied to the liquid crystal layer is the same in the positive polarity and in the negative polarity, description is provided just related to the drain voltage $V_{DRAIN}$ in which the voltage applied to the liquid crystal layer is of a positive polarity.

In such a case, a voltage $V_{LC1L}$ applied to the liquid crystal layer in the subpixel 16a when the first common electrode voltage $V_{C1}$ is Low is, as shown in (a) of FIG. 5, $$V_{LC1L} = V_S/2 + V_{COM1}/2 - \Delta V.$$

Moreover, a voltage $V_{LC1H}$ applied to the liquid crystal layer in the subpixel 16a when the first common electrode voltage $V_{C1}$ is High is, as shown in (a) of FIG. 5, $$V_{LC1H} = V_S/2 + V_D - V_{COM1}/2 - \Delta V.$$

At this time, an effective value $V_{LC1E}$ of the voltage $V_{LC1}$ applied to the liquid crystal layer in the subpixel 16a is calculated by the following formula (formula 1):

Math. 1

$$V_{LC1E} = \sqrt{\frac{1}{2}(V_{LC1L}^2 + V_{LC1H}^2)} \quad \text{(formula 1)}$$
$$= \sqrt{\frac{1}{2}\left(\frac{V_S'^2}{2} + V_D^2 + V_S'V_D + \frac{V_{COM1}^2}{2} - V_D V_{COM1}\right)}$$

where $V_S/2 - \Delta V = V_S'/2$. If the feed-through voltage is not taken into consideration, $\Delta V = 0$.

On the other hand, a voltage $V_{LC2L}$ applied to the liquid crystal layer of the subpixel 16b when the second common electrode voltage $V_{C2}$ is Low is, as illustrated in (b) of FIG. 5, $$V_{LC2L} = V_S/2 + V_{COM2}/2 - \Delta V.$$

Moreover, a voltage $V_{LC2H}$ applied to the liquid crystal layer of the subpixel 16b when the second common electrode voltage $V_{C2}$ is High is, as illustrated in (b) of FIG. 5, $$V_{LC2H} = V_S/2 + V_D - V_{COM2}/2 - \Delta V.$$

At this time, an effective value $V_{LC2E}$ of the voltage $V_{LC2}$ applied to the liquid crystal layer of the subpixel 16b is calculated by the following formula (formula 2):

Math. 2

$$V_{LC2E} = \sqrt{\frac{1}{2}(V_{LC2L}^2 + V_{LC2H}^2)} \quad \text{(formula 2)}$$
$$= \sqrt{\frac{1}{2}\left(\frac{V_S'^2}{2} + V_D^2 + V_S^1 V_D + \frac{V_{COM2}^2}{2} - V_D V_{COM2}\right)}.$$

When the $V_{COM1}$ and $V_{COM2}$ are different as described above, the effective value $V_{LC1E}$ and the effective value $V_{LC2E}$ become different from each other, and the voltages applied to the liquid crystal layer of the subpixel 16a and of the subpixel 16b differ from each other. As a result, different areas in the V-T curve are formed in a single pixel, thereby allowing for improving the excess brightness.

A rectangular wave $V_{DRAIN}'$ illustrated by the broken lines in (a) and (b) of FIG. 5 is a waveform of a drain voltage assumed to be obtained in each cases if no subpixel configuration were provided. Amplitude of the rectangular wave of the drain voltage is usually determined by its amplitude of the counter electrode. However, with the driving method illustrated in (a) and (b) of FIG. 5, there are two types of amplitudes of the counter electrodes. Therefore, the amplitude $V_D$ of the actual drain voltage is of a value between the amplitudes of the broken line rectangular waves $V_{DRAIN}'$ illustrated in (a) and (b) of FIG. 5, respectively. It can be seen from (a) and (b) of FIG. 5 that the drain voltage that would have been the broken line rectangular wave $V_{DRAIN}'$ if the subpixel configuration was not employed, changes by providing the two types of counter amplitudes.

Figure 10:
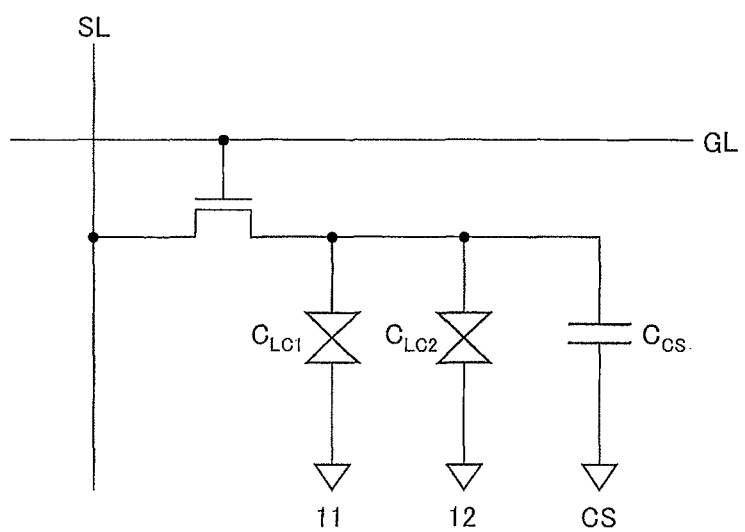
FIG. 10 is a view partially illustrating a circuit diagram of a liquid crystal display device according to the present invention.

Next described is a method of changing $V_D$ by providing the storage capacitor Ccs, with reference to FIG. 10.

FIG. 10 is a circuit diagram of a part of a liquid crystal display device that includes the storage capacitor Ccs. For easy explanation, the following description explains just a case in which the center voltage of the first common electrode voltage $V_{C1}$ and the center voltage of the second common electrode voltage $V_{C2}$ are in common however their amplitudes differ. Note however that the same applies in a case in which the center voltages differ from each other. In FIG. 10, $C_{LC1}$ and $C_{LC2}$ represent liquid crystal capacitors of the subpixels 16a and 16b, respectively, and their magnitudes are $C_1$ and $C_2$, respectively.

In the embodiment, a drain voltage upon consideration of $V_D$ in a case in which the common electrode voltage is Low is $V_{DL}$, and that in a case in which the common electrode voltage is High is $V_{DH}$. At this time, $V_{DL} = V_S/2$, and $V_{DH} = V_S/2 + V_D$. When the first common electrode voltage $V_{C1}$ and the second common electrode voltage $V_{C2}$ are Low, the voltage $V_{LC1L}$ applied to the liquid crystal layer of the subpixel 16a is $V_{LC1L} = V_{DL} + V_{COM1}/2 = V_S/2 + V_{COM1}/2$, the voltage $V_{LC2L}$ applied to the liquid crystal layer of the subpixel 16b is similarly $V_S/2 + V_{COM2}/2$, and the voltage applied to the storage capacitor Ccs is $V_S/2 + V_{CS}/2$. Hence, an electric charge $Q_L$ stored by the liquid crystal capacitors $C_{LC1}$, $C_{LC2}$ and the storage capacitor Ccs is $$Q_L = C_1(V_S/2 + V_{COM1}/2) + C_2(V_S/2 + V_{COM2}/2) + C_{CS}(V_S/2 + V_{CS}/2) + \Lambda.$$

The $\Lambda$ is an electric charge stored in a parasitic capacitor to which the drain electrode 14 is connected. More specifically, the $\Lambda$ is caused by a parasitic capacitor formed between the drain electrode 14 and the data signal line SL, a parasitic capacitor formed between the drain electrode 14 and the scanning signal line GL of an adjacent pixel PIX, and the like.

On the other hand, when the first common electrode voltage $V_{C1}$ and the second common electrode voltage $V_{C2}$ are High, the voltage $V_{LC1H}$ applied to the liquid crystal layer of the subpixel 16a is $V_{DH} - V_{COM1}/2$, the voltage $V_{LC2H}$ applied to the liquid crystal layer of the subpixel 16b is $V_{DH} - V_{COM2}/2$, and the voltage applied to the storage capacitor Ccs is $V_{DH} - V_{CS}/2$. Hence, an electric charge $Q_H$ stored in the liquid crystal capacitors $C_{LC1}$, $C_{LC2}$ and the storage capacitor Ccs is $$Q_H = C_1(V_{DH} - V_{COM1}/2) + C_2(V_{DH} - V_{COM2}/2) + C_{CS}(V_{DH} - V_{CS}/2) + \Lambda.$$

The electric charge is conserved, and so thus is $Q_L = Q_H$. Accordingly, $$V_{DH}(C_1 + C_2 + C_{CS}) = V_S(C_1 + C_2 + C_{CS})/2 + C_1 V_{COM1} + C_2 V_{COM2} + C_{CS} V_{CS}$$

$$V_{DH} = V_S/2 + C_1 V_{COM1}/(C_1 + C_2 + C_{CS}) + C_2 V_{COM2}/(C_1 + C_2 + C_{CS}) + C_{CS} V_{CS}/(C_1 + C_2 + C_{CS}).$$

As described above, $V_{DH} = V_S/2 + V_D$, so therefore $V_D$ is represented as follows:

$$V_D = (C_1/\Sigma C)V_{COM1} + (C_2/\Sigma C)V_{COM2} + (C_{CS}/\Sigma C)V_{CS},$$

where $C_1 + C_2 + C_{CS} = \Sigma C$.

Namely, by changing the value of $C_{CS}$ or $V_{CS}$, the value of $V_D$ may be controlled to be any value.

Figure 1:
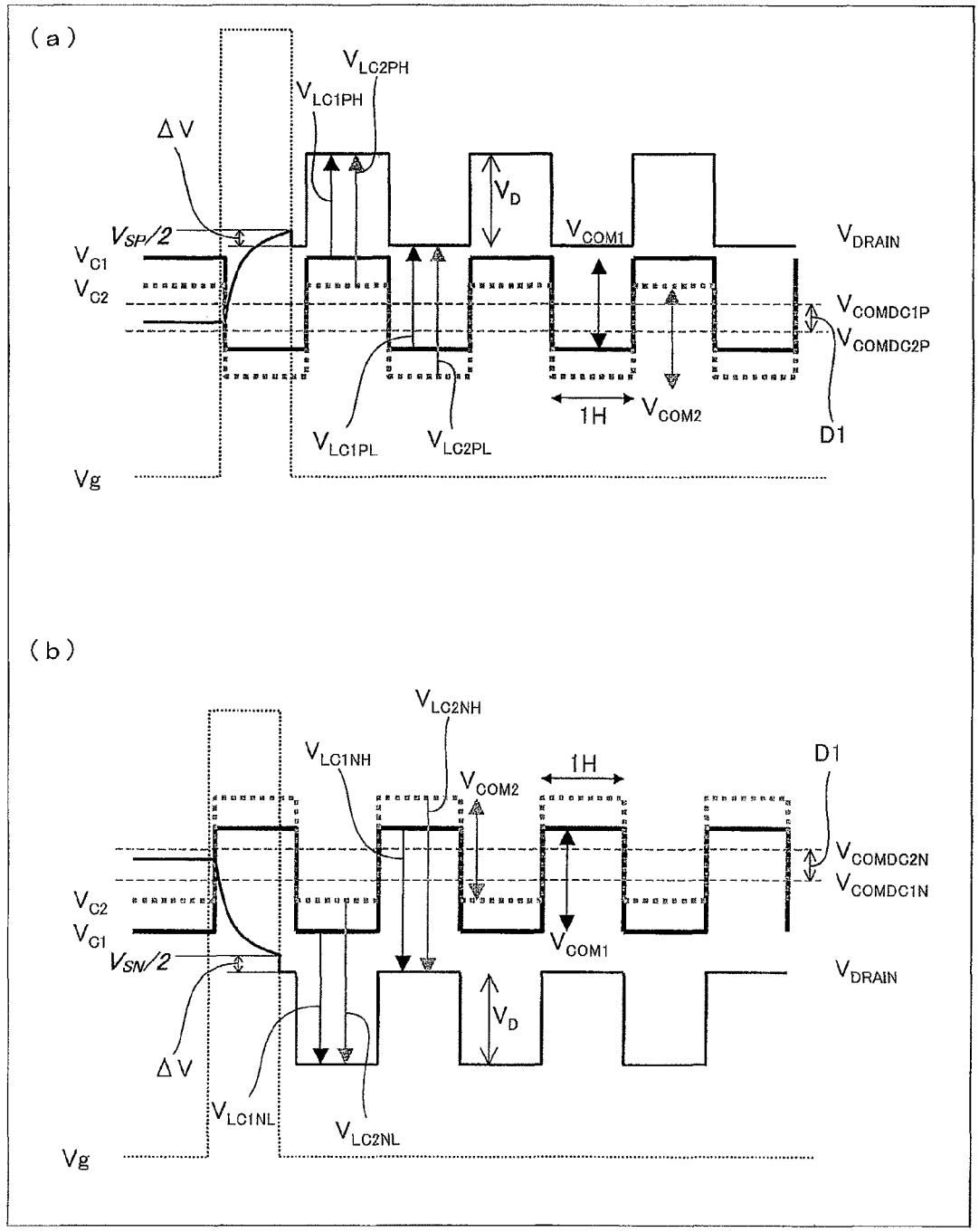
FIG. 1 is a timing chart of each voltage in an embodiment of the present invention; (a) illustrates a case in a positive polarity and (b) illustrates a case in a negative polarity.

Next described is the case of the foregoing (ii), namely, the driving method of applying different voltages to the liquid crystal layer of the subpixels 16a and 16b when the center voltage of the first common electrode voltage $V_{C1}$ differs from the center voltage of the second common electrode voltage $V_{C2}$ (see FIG. 1).

As illustrated in FIG. 1, both of the first common electrode voltage $V_{C1}$ and the second common electrode voltage $V_{C2}$ are voltages for AC drive that change every 1H period. A center voltage $V_{COMDC1}$ of the first common electrode voltage $V_{C1}$ is of a different value from a center voltage $V_{COMDC2}$ of the second common electrode voltage $V_{C2}$. The magnitude $V_{COM1}/2$ of the amplitude of the first common electrode voltage $V_{C1}$ is in common with the magnitude $V_{COM2}/2$ of the amplitude of the second common electrode voltage $V_{C2}$, and its value is $V_{COM}/2$. As shown below, although the voltages are common in their amplitudes, their center voltages differ from each other. As a result, the effective voltage $V_{LC1E}$ applied to the liquid crystal layer of the subpixel 16a differs from the effective voltage $V_{LC2E}$ applied to the liquid crystal layer of the subpixel 16b.

The $V_S/2$ is applied to the drain electrode 14 as the drain voltage $V_{DRAIN}$, however a fall in the voltage occurs by the feed-through voltage $\Delta V$. Similarly with the case in which the center voltage of the first common electrode voltage $V_{C1}$ is in common with the center voltage of the second common electrode voltage $V_{C2}$, the drain voltage $V_{DRAIN}$ changes in the magnitude by $V_D$ every 1H period, linked together with the behavior of the common electrode voltages.

Moreover, in order to prevent the image sticking of the liquid crystal layer, the drain voltage $V_{DRAIN}$ carries out inversion driving. Illustrated in (a) of FIG. 1 is a case in which the voltage applied to the liquid crystal layer is positive (positive polarity), and illustrated in (b) of FIG. 1 is a case in which the voltage applied to the liquid crystal layer is negative (negative polarity). The drain voltage $V_{DRAIN}$ is driven inversely with respect to an average electric potential of $V_{COMDC1}$ and $V_{COMDC2}$. In a case in which the feed-through voltage $\Delta V$ is being taken into consideration, the voltages may be set and be driven so that an average value of the drain voltage $V_{DRAIN}$ in the positive polarity which has been fed through and the drain voltage $V_{DRAIN}$ in the negative polarity which has been fed through is made equal to an average value of the center voltage $V_{COMDC1}$ and the center voltage $V_{COMDC2}$. In other words, a voltage written into the drain electrode 14 (in the embodiment, $V_S/2$) may be any voltage as long as it is a voltage which is reversed in a case in which the voltage is greater by the feed-through voltage than an average of the center voltage $V_{COMDC1}$ and center voltage $V_{COMDC2}$.

In such a case, a voltage $V_{LC1PL}$ applied to the liquid crystal layer of the subpixel 16a when the polarity is positive and the first common electrode voltage $V_{C1}$ is Low is, as illustrated in (a) of FIG. 1, $$V_{LC1PL} = V_{SP}/2 + V_{COM1}/2 - V_{COMDC1P} - \Delta V$$
$$= V_{SP}/2 + V_{COM}/2 - V_{COMDC1P} - \Delta V,$$

where $V_{SP}/2$ is a drain voltage applied to the drain electrode 14 in the positive polarity and $V_{COMDC1P}$ is a center voltage $V_{COMDC1}$ of the first common electrode voltage $V_{C1}$ in the positive polarity.

Moreover, a voltage $V_{LC1PH}$ applied to the liquid crystal layer of the subpixel 16a when the polarity is positive and the first common electrode voltage $V_{C1}$ is High is as shown by the following formula (formula 3), as illustrated in (a) of FIG. 1:

$$V_{LC1PH} = V_{SP}/2 + V_D - V_{COM1}/2 - V_{COMDC1P} - \Delta V \quad \text{(formula 3)}$$
$$= V_{SP}/2 + V_D - V_{COM}/2 - V_{COMDC1P} - \Delta V$$

If the $V_D$ is set so that the $V_D$ is equal to $V_{COM}$, the formula (formula 3) becomes as follows:

$$V_{LC1PH} = V_{SP}/2 + V_{COM}/2 - V_{COMDC1P} - \Delta V.$$

Namely, in whichever case in which the first common electrode voltage $V_{C1}$ is High or Low, the applied voltage becomes $V_{SP}/2 + V_{COM}/2 - V_{COMDC1P} - \Delta V (= V_{LC1P})$.

On the other hand, the voltage $V_{LC1NL}$ applied to the liquid crystal layer of the subpixel 16a when the polarity is negative and the first common electrode voltage $V_{C1}$ is Low is, as illustrated in (b) of FIG. 1, $$V_{LC1NL} = V_{SN}/2 - V_D + V_{COM1}/2 - V_{COMDC1N} - \Delta V$$
$$= V_{SN}/2 - V_{COM}/2 - V_{COMDC1N} - \Delta V,$$

where $V_{SN}/2$ is a drain voltage applied to the drain electrode 14 in the negative polarity, and $V_{COMDC1N}$ is the center voltage $V_{COMDC1}$ of the first common electrode voltage $V_{C1}$ in the negative polarity.

Moreover, the voltage $V_{LC1NH}$ applied to the liquid crystal layer of the subpixel 16a when the polarity is negative and the first common electrode voltage $V_{C1}$ is High, is, as illustrated in (b) of FIG. 1, $$V_{LC1NH} = V_{SN}/2 - V_{COM1}/2 - V_{COMDC1N} - \Delta V$$
$$= V_{SN}/2 - V_{COM}/2 - V_{COMDC1N} - \Delta V.$$

Namely, in whichever case in which the first common electrode voltage $V_{C1}$ is High or Low, the applied voltage is $V_{SN}/2 - V_{COM}/2 - V_{COMDC1N} - \Delta V (= V_{LC1N})$.

At this time, the effective value $V_{LC1E}$ of the voltage applied to the liquid crystal layer of the subpixel 16a is represented by the following formula (formula 4):

Math. 3

$$V_{LC1E} = \sqrt{\tfrac{1}{2}(V_{LC1P}^2 + V_{LC1N}^2)} \quad \text{(formula 4)}$$

Next described is the voltage applied to the subpixel 16b. The voltage $V_{LC2PL}$ applied to the liquid crystal layer of the subpixel 16b when the polarity is positive and the second common electrode voltage $V_{C2}$ is Low is, as illustrated in (a) of FIG. 1, $$V_{LC2PL} = V_{SP}/2 + V_{COM2}/2 - V_{COMDC2P} - \Delta V$$
$$= V_{SP}/2 + V_{COM}/2 - V_{COMDC2P} - \Delta V.$$

Moreover, the voltage $V_{LC2PH}$ applied to the liquid crystal layer of the subpixel 16b when the second common electrode voltage $V_{C2}$ is High is, as illustrated in (a) of FIG. 1, $$V_{LC2H} = V_S/2 + V_D - V_{COM2}/2 - V_{COMDC2} - \Delta V$$
$$= V_S/2 + V_{COM} - V_{COM}/2 - V_{COMDC2} - \Delta V$$
$$= V_S/2 + V_{COM}/2 - V_{COMDC2} - \Delta V.$$

Namely, whichever the case in which the second common electrode voltage $V_{C2}$ is High or Low, the voltage applied is $V_{SP}/2 + V_{COM}/2 - V_{COMDC2P} - \Delta V (= V_{LC2P})$.

On the other hand, the voltage $V_{LC2NL}$ applied to the liquid crystal layer of the subpixel 16b when the polarity is negative and the second common electrode voltage $V_{C2}$ is Low is, as illustrated in (b) of FIG. 1, $$V_{LC2NL} = V_{SN}/2 - V_D + V_{COM2}/2 - V_{COMDC2N} - \Delta V$$
$$= V_{SN}/2 - V_{COM}/2 - V_{COMDC2N} - \Delta V,$$

where $V_{COMDC2N}$ is the center voltage $V_{COMDC2}$ of the second common electrode voltage $V_{C1}$ in the negative polarity.

Moreover, the voltage $V_{LC2NH}$ applied to the liquid crystal layer of the subpixel 16b when the polarity is negative and the second common electrode voltage $V_{C2}$ is High is, as illustrated in (b) of FIG. 1, $$V_{LC2NH} = V_{SN}/2 - V_{COM2}/2 - V_{COMDC2N} - \Delta V$$

$$= V_{SN}/2 - V_{COM}/2 - V_{COMDC2N} - \Delta V.$$

Namely, in whichever case of the second common electrode voltage $V_{C2}$ being High or Low, the voltage applied is $V_{SN}/2 - V_{COM}/2 - V_{COMDC2N} - \Delta V (=V_{LC2N})$.

At this time, the effective value $V_{LC2E}$ of the voltage applied to the liquid crystal layer of the subpixel 16b is calculated by the following formula (formula 5):

Math. 4

$$V_{LC2E} = \sqrt{1/2(V_{LC2P}^2 + V_{LC2N}^2)} \quad \text{(formula 5)}$$

Different from $V_{COMDC1P}$ and $V_{COMDC2P}$, $V_{COMDC1N}$ differs from $V_{COMDC2N}$, which causes the effective value $V_{LC1E}$ to differ from the effective value $V_{LC2E}$. As a result, the voltages applied to the liquid crystal layer of respective subpixel 16a and subpixel 16b become different from each other. As a result, different areas in the V-T curve are formed within a single pixel, thereby allowing for improvement in excess brightness.

As described above, the larger the difference between the voltage $V_{LC1}$ applied on the liquid crystal layer of the subpixel 16a and the voltage $V_{LC2}$ applied on the liquid crystal layer of the subpixel 16b, the greater the viewing angle improvement effect is. When focusing on the difference between the effective voltage $V_{LC1E}$ applied to the liquid crystal layer of the subpixel 16a and the effective voltage $V_{LC2E}$ applied to the liquid crystal layer in the subpixel 16b, in a case in which the center voltages of the common electrode voltages are in common, the difference becomes a difference between the value of the foregoing formula (formula 1) and the value of the foregoing formula (formula 2), thereby being a value of the following formula (formula 6):

Math. 5

$$\sqrt{\frac{1}{2}\left(\frac{V_S'^2}{2} + V_D^2 + V_S'V_D + \frac{V_{COM1}^2}{2} - V_D V_{COM1}\right)} -$$
$$\sqrt{\frac{1}{2}\left(\frac{V_S'^2}{2} + V_D^2 + V_S'V_D + \frac{V_{COM2}^2}{2} - V_D V_{COM2}\right)} \quad \text{(formula 6)}$$

As the difference between $V_{COM1}$ and $V_{COM2}$ increases, that is, the larger the difference between the amplitude of the first common electrode voltage $V_{C1}$ and the amplitude of the second common electrode voltage $V_{C2}$, the more the value represented by the foregoing formula (formula 6) increases.

On the other hand, when the center voltage of the common electrode voltages differ from each other, the difference in the voltage applied to the liquid crystal layer becomes the difference between the value of the foregoing formula (formula 4) and the value of the foregoing formula (formula 5), thereby being a value of the following formula (formula 7):

$$|V_{COMDC1P} - V_{COMDC2P}| \quad \text{(formula 7)}.$$

As described later, when the polarity of the drain voltage $V_{DRAIN}$ is reversed, the center voltage $V_{COMDC1}$ of the first common electrode voltage $V_{C1}$ and the center voltage $V_{COMDC2}$ of the second common electrode voltage $V_{C2}$ are replaced with each other. Namely, $V_{COMDC1P}=V_{COMDC2N}$, and $V_{COMDC1N}=V_{COMDC2P}$. Accordingly, $|V_{COMDC1P}-V_{COMDC2P}|=|V_{COMDC1N}-V_{COMDC2N}|$. On this account, in the following descriptions, (formula 7) is simply described as $|V_{COMDC1}-V_{COMDC2}|$.

The larger the difference between $V_{COMDC1}$ and $V_{COMDC2}$, i.e. the larger the difference between the center voltage of the first common electrode voltage $V_{C1}$ and the center voltage of the second common electrode voltage $V_{C2}$, the greater the value represented by the foregoing formula (formula 7) is.

Focusing on just one 1H period, the difference in the applied voltages between subpixels become identical between the case in which the center voltages of the common electrode voltages are made in common and the case in which the center voltages thereof are made different, when half a difference (magnitude shown as width D2 in (c) of FIG. 5) in amplitudes of the common electrodes in the case in which the center voltages of the common electrode voltages are in common is equal to the difference between the center voltages (magnitude shown as width D1 in (a) and (b) of FIG. 1) in the case in which the center voltages of the common electrode voltages are of different voltages. Namely, the differences in the applied voltages between the subpixels become identical when a condition of the following formula (formula 8) is satisfied:

$$|(V_{COM1}-V_{COM2})/2|=|V_{COMDC1}-V_{COMDC2}| \quad \text{(formula 8)}.$$

Hence, in a case in which just one 1H period is being focused, upon satisfying the conditions of the foregoing formula (formula 8), the difference between the voltage $V_{LC1}$ applied to the liquid crystal layer of the subpixel 16a and the voltage $V_{LC2}$ applied to the liquid crystal layer of the subpixel 16b becomes equal in the case in which the center voltages of the common electrode voltages are in common and in the case in which the center voltages of the common electrode voltages are different from each other.

However, in the case in which the condition of the foregoing formula (formula 8) is satisfied, the value of the foregoing formula (formula 7) becomes larger than the value of the foregoing formula (formula 6). That is to say, the difference of effective applied voltages between subpixels when the center voltages of the common electrode voltages are different from each other is larger than the difference of effective applied voltages between subpixels when the center voltages of the common electrode voltages are in common.

Figure 11:
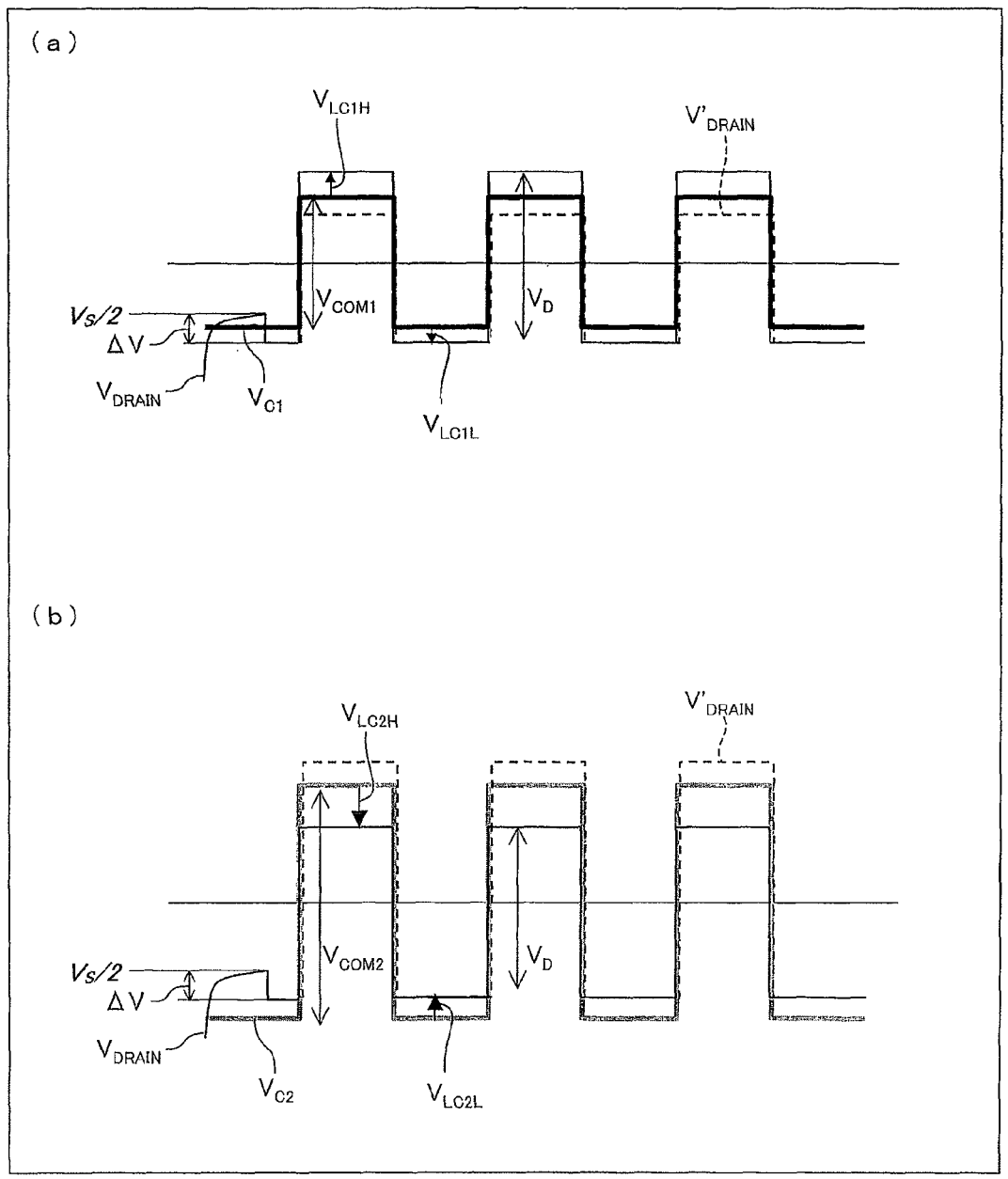
FIG. 11 is another timing chart of voltages in a case in which common electrodes have a common center voltage; (a) and (b) each show a timing chart of signals in different common electrodes.
Figure 12:
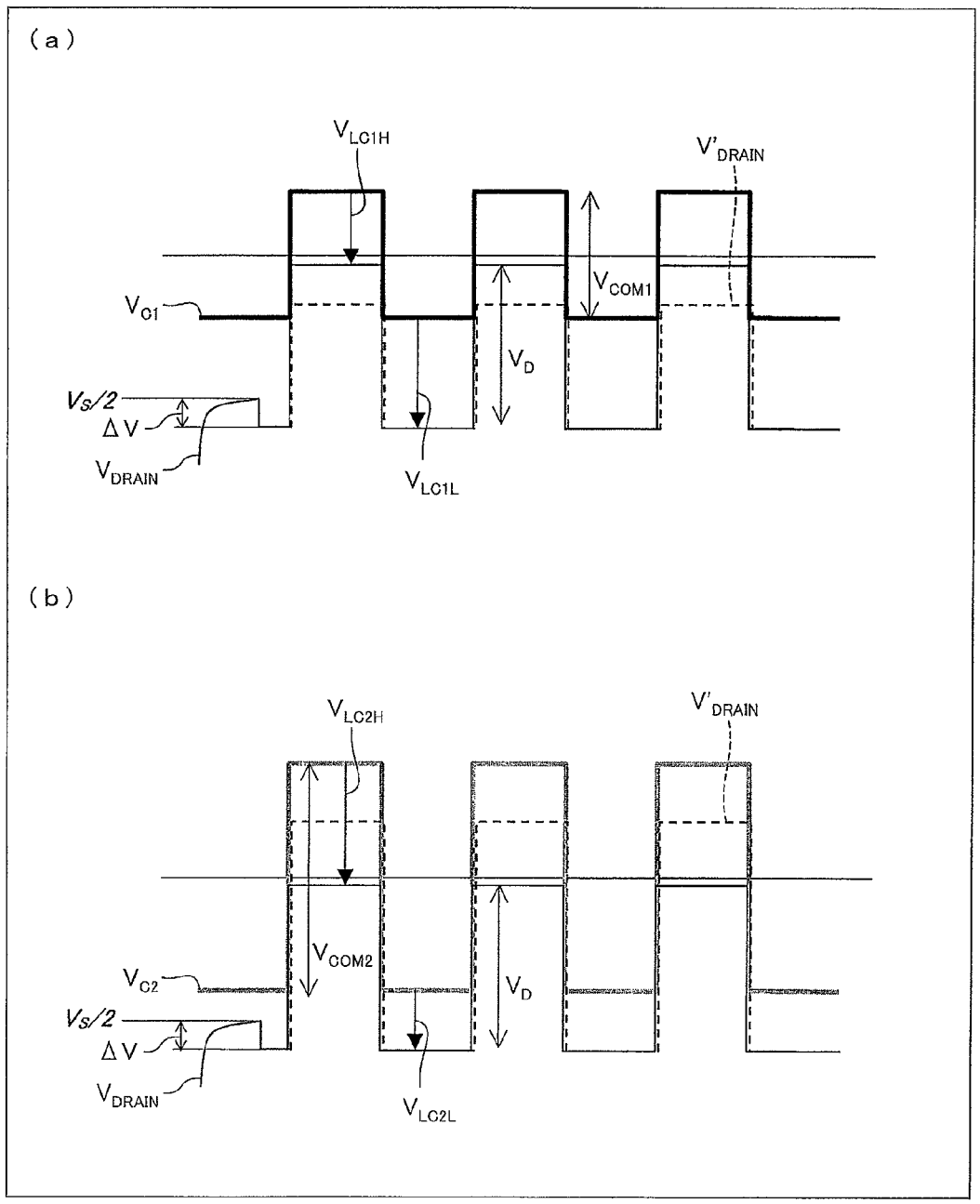
FIG. 12 is yet another timing chart of voltages in a case in which a center voltage of the common electrodes are shared, and (a) and (b) each show a timing chart of signals in different common electrodes.

Below describes this with reference to specific examples. The following description first deals with cases in which the center voltages of the common electrode voltages are in common however the amplitudes of the common electrode voltages are made different from each other: (1) a case in which the drain voltage $V_{DRAIN}$ of a positive polarity in consideration of $V_D$ is set higher than $V_{C1}$ and $V_{C2}$ in either cases of High and Low (FIG. 5), (2) a case in which the drain voltage $V_{DRAIN}$ of a positive polarity in consideration of $V_D$ is set between $V_{C1}$ and $V_{C2}$ in either cases of High and Low (FIG. 11), and (3) a case in which the drain voltage $V_{DRAIN}$ of a positive polarity in consideration of $V_D$ is set lower than $V_{C1}$ and $V_{C2}$ in either cases of High and Low (FIG. 12).

First, in the case in which the drain voltage $V_{DRAIN}$ having a positive polarity in consideration of $V_D$ is set higher than $V_{C1}$ and $V_{C2}$ in either cases of High and Low, and $V_S$=4 V, $V_{COM1}$=4 V, $V_{COM2}$=8 V, $V_D$=5 V, and $\Delta V$=1 V, the following equations are satisfied:

$$V_{LC1L}=V_S/2+V_{COM1}/2-\Delta V=3\text{ V}$$

$$V_{LC1H}=V_S/2+V_D-V_{COM1}/2-\Delta V=4\text{ V},$$

and the effective value $V_{LC1E}$ of a voltage applied to the liquid crystal layer of the subpixel 16a, which applied voltage is represented by the following formula (formula 9):
Math. 6

$$V_{LC1E} = \sqrt{\tfrac{1}{2}(V_{LC1L}^2 + V_{LC1H}^2)} \quad \text{(formula 9)}$$

is approximately 3.54 V. Moreover, $$V_{LC2L} = V_S/2 + V_{COM2}/2 - \Delta V = 5\text{ V},$$

$$V_{LC2H} = V_S/2 + V_D - V_{COM2}/2 - \Delta V = 2\text{ V},$$

and the effective value $V_{LC2E}$ of the voltage applied to the liquid crystal layer of the subpixel 16b represented by the following formula (formula 10):
Math. 7

$$V_{LC2E} = \sqrt{\tfrac{1}{2}(V_{LC2L}^2 + V_{LC2H}^2)} \quad \text{(formula 10)}$$

becomes approximately 3.81 V. Hence, in a case in which the center voltages of the common electrode voltages are made in common, the difference between subpixels of the effective applied voltage is approx. 3.54 V−approx. 3.81 V|=approx. 0.27 V.

Secondly described is the case in which the drain voltage $V_{DRAIN}$ of the positive polarity in consideration of $V_D$ is set so as to be between the $V_{C1}$ and $V_{C2}$ in either cases of High and Low. FIG. 11 is a chart diagram at this point in time; (a) of FIG. 11 is a chart diagram in the subpixel 16a, and (b) of FIG. 11 is a chart diagram in the subpixel 16b. When each of the voltages is $V_S = -3$ V, $V_{COM1} = 4$ V, $V_{COM2} = 8$ V, $V_D = 5$ V, and $\Delta V = 1$ V, $$V_{LC1L} = V_S/2 + V_{COM1}/2 - \Delta V = -0.5\text{ V},$$

$$V_{LC1H} = V_S/2 + V_D - V_{COM1}/2 - \Delta V = 0.5\text{ V},$$

and the effective value $V_{LC1E}$ of the voltage applied to the liquid crystal layer of the subpixel 16a represented by the foregoing formula (formula 9) is 0.5 V. Moreover, $$V_{LC2L} = V_S/2 + V_{COM2}/2 - \Delta V = 1.5\text{ V},$$

$$V_{LC2H} = V_S/2 + V_D - V_{COM2}/2 - \Delta V = -1.5\text{ V},$$

and the effective value effective value $V_{LC2E}$ of the voltage applied to the liquid crystal layer of the subpixel 16b represented by the foregoing formula (formula 10) is 1.5 V. Hence, the difference between subpixels of the effective applied voltage in the case in which the center voltages of the common electrode voltages are in common is

|0.5 V−1.5 V|=1 V.

Finally described is the case in which the drain voltage $V_{DRAIN}$ having a positive polarity in consideration of $V_D$ is set lower than the $V_{C1}$ and $V_{C2}$ in either cases of High and Low. FIG. 12 is a chart diagram at this point in time; (a) of FIG. 12 is a chart diagram in the subpixel 16a, and (b) of FIG. 12 is a chart diagram in the subpixel 16b. When the voltages are set as $V_S = -10$ V, $V_{COM1} = 4$ V, $V_{COM2} = 8$ V, $V_D = 5$ V, and $\Delta V = 1$ V, $$V_{LC1L} = V_S/2 + V_{COM1}/2 - \Delta V = -4\text{ V},$$

$$V_{LC1H} = V_S/2 + V_D - V_{COM1}/2 - \Delta V = -3\text{ V},$$

and the effective value $V_{LC1E}$ of the voltage applied to the liquid crystal layer of the subpixel 16a represented by the foregoing formula (formula 9) is approximately 3.54 V. Moreover, $$V_{LC2L} = V_S/2 + V_{COM2}/2 - \Delta V = -2\text{ V},$$

$$V_{LC2H} = V_S/2 + V_D - V_{COM2}/2 - \Delta V = -5\text{ V},$$

and the effective value $V_{LC2E}$ of the voltage applied to the liquid crystal layer of the subpixel 16b represented by the foregoing formula (formula 10) is approximately 3.81 V. Hence, in the case in which the center voltages of the common electrode voltages are in common, the difference between subpixels of the effective applied voltage is

|approx. 3.54 V−approx. 3.81 V|=approx. 0.27 V.

On the other hand, in a case in which a difference is provided between the center voltages of the common electrode voltages whereas the amplitudes of the common electrode voltages are made in common, and $V_{SP} = 12$ V, $V_{SN} = 0$ V, $V_{COMDC1P} = 3$ V, $V_{COMDC2P} = 1$ V, $V_{COMDC1N} = 1$ V, $V_{COMDC2N} = 3$ V, $V_D = 4$ V, $V_{COM} = 4$ V, and $\Delta V = 1$ V, $$V_{LC1P} = V_{SP}/2 + V_{COM}/2 - V_{COMDC1P} - \Delta V = 4\text{ V},$$

$$V_{LC1N} = V_{SN}/2 - V_{COM}/2 - V_{COMDC1N} - \Delta V = -4\text{ V},$$

and the effective value $V_{LC1E}$ represented by the foregoing formula (formula 4) is 4 V. Moreover, $$V_{LC2P} = V_{SP}/2 + V_{COM}/2 - V_{COMDC2P} - \Delta V = 6\text{ V},$$

$$V_{LC2N} = V_{SN}/2 - V_{COM}/2 V_{COMDC2N} - \Delta V = -6\text{ V},$$

and the effective value $V_{LC2E}$ represented by the foregoing formula (formula 5) is 6 V. Hence, in a case in which the center voltages of the common electrode voltages are made different from each other, the difference between subpixels in the effective applied voltage is 2 V $(=|V_{COMDC1} - V_{COMDC2}|)$. Accordingly, the difference in the effective applied voltage between subpixels when the center voltages of the common electrode voltages are different from each other is larger than the difference in the effective applied voltage between subpixels when the center voltages of the common electrode voltages are in common, and thus can have the applied voltages be different from each other more efficiently.

The larger the difference in the applied voltages between the subpixels, the greater the improvement effect of the viewing angle characteristics that can be achieved. Hence, by having the center voltage $V_{COMDC1}$ of the first common electrode voltage $V_{C1}$ be of a different value from the center voltage $V_{COMDC2}$ of the second common electrode voltage $V_{C1}$, it is possible to achieve a larger viewing angle characteristic improvement effect.

In the present embodiment, the center voltage $V_{COMDC1}$ of the first common electrode voltage $V_{C1}$ and the center voltage $V_{COMDC2}$ of the second common electrode voltage $V_{C2}$ are replaced with each other when the polarity of the drain voltage $V_{DRAIN}$ is reversed, in order to prevent the image sticking in the liquid crystal. For example, with a driving method in which the polarity is changed every one frame, where the value of the center voltage $V_{COMDC1}$ of the first common electrode voltage $V_{C1}$ in the positive polarity is $V_A$ and the value of the center voltage $V_{COMDC2}$ of the second common electrode voltage $V_{C2}$ in the positive polarity is $V_B$, which is a different value from $V_A$, in a subsequent frame, i.e. a negative polarity, the value of the center voltage $V_{COMDC1}$ of the first common electrode voltage $V_{C1}$ becomes $V_B$, and the value of the center voltage $V_{COMDC2}$ of the second common electrode voltage $V_{C2}$ becomes $V_A$. The center voltages are replaced with each other again in a further subsequent frame. The change in values of the center voltages $V_{COMDC1}$ and $V_{COMDC2}$ of the common electrode voltages in the frames in this case is as shown in the following Table 1.

TABLE 1

| | Frames | | | | | | |
|---|---|---|---|---|---|---|---|
| | 1 | 2 | 3 | 4 | 5 | 6 | ... |
| Center voltage $V_{COMDC1}$ of first common electrode voltage $V_{C1}$ | $V_A$ | $V_B$ | $V_A$ | $V_B$ | $V_A$ | $V_B$ | ... |
| Center voltage $V_{COMDC2}$ of second common electrode voltage $V_{C2}$ | $V_B$ | $V_A$ | $V_B$ | $V_A$ | $V_B$ | $V_A$ | ... |

A timing in which the center voltages of the common electrode voltages are replaced can be a timing that is in line with the driving, such as every line, every one frame, every two frames, . . . , every N frames. Moreover, other than this, the center voltages of the common electrodes may be replaced in a timing in which the liquid crystal modules switches over in mode, such as into a rest mode or into a partial drive mode.

In the present embodiment, the values $V_A$ and $V_B$ of the center voltages $V_{COMDC1}$ and $V_{COMDC2}$ are values which cause the drain voltage $V_{DRAIN}$ to be reversed at a value greater by $\Delta V$ than an average of the values $V_A$ and $V_B$.

Accordingly, the voltage applied to the liquid crystal layer in a positive polarity after the feed-through of the voltage of $\Delta V$ has occurred to the drain voltage $V_{DRAIN}$ is of a same magnitude but with opposite polarities to a voltage applied to the liquid crystal layer in the negative polarity. The following describes this more specifically, with reference to (a) and (b) of FIG. 1. The voltage $V_{LC1H}$ ($V_{LC1PH}$ in (a) of FIG. 1) applied to the liquid crystal layer in the subpixel 16a of a positive polarity when the first common electrode voltage $V_{C1}$ is High is a voltage having a same magnitude but with an opposite orientation, to the voltage $V_{LC1L}$ ($V_{LC1NL}$ in (b) of FIG. 1) applied to the liquid crystal layer of the subpixel 16a in the negative polarity when the first common electrode voltage $V_{C1}$ is Low. Similarly, the voltage $V_{LC1L}$ ($V_{LC1PL}$ in (a) of FIG. 1) applied to the liquid crystal layer of the subpixel 16a in the positive polarity when the first common electrode voltage $V_{C1}$ is Low is a voltage having a same magnitude but with an opposite orientation to the voltage $V_{LC1H}$ ($V_{LC1NH}$ in (b) of FIG. 1) applied to the liquid crystal layer of the subpixel 16a in the negative polarity when the first common electrode voltage $V_{C1}$ is High. Hence, the effective values of the voltages applied to the liquid crystal layer of the subpixel 16a in the positive polarity and in the negative polarity are voltages which have the same magnitude but which are opposite in orientation.

Hence, even if the center voltages of the common electrodes are different in the center of inversion of the polarity of the drain voltages, voltages of a same magnitude but with opposite positive and negative polarities are regularly applied to the liquid crystal layer of the subpixels; this prevents the liquid crystal layer from image sticking.

Furthermore, in order to form a plurality of areas in which the V-T characteristics differ in a single pixel, at least two types of common electrodes are associated to each of the pixel electrodes; when the liquid crystal display device is driven, the first common electrode voltage is applied to the first common electrode, and the second common electrode voltage is applied to the second common electrode. At this time, the center voltage of the first common electrode voltage is made to be different from the center voltage of the second common electrode voltage; this as a result allows for the voltage applied to the liquid crystal layer in the first area, i.e. the liquid crystal layer sandwiched between the first area of the pixel electrode and the first common electrode, to be different from the voltage applied to the liquid crystal layer in the second area, i.e., the liquid crystal layer sandwiched between the second area of the pixel electrode and the second common electrode.

This allows for providing, within a single pixel, a plurality of areas whose V-T characteristics differ therebetween, by dividing the pixel electrode into a plurality of subpixel electrodes without providing a switching element such as a TFT to each of the subpixel electrodes. Hence, it is possible to minimize the reduction in aperture ratio caused by a separately provided switching element, as in the conventional technique.

Although in the present embodiment the amplitude of the first common electrode voltage $V_{C1}$ is in common with the amplitude of the second common electrode voltage $V_{C2}$, the amplitudes may be set so as to be different from each other. However, in view of attaining a greater effect in the improvement of the viewing angle characteristics, it is preferable that the magnitudes of the amplitudes are in common.

Described below is another embodiment of the liquid crystal display device 1 according to the present invention, with reference to FIG. 6. For convenience in description, members having identical functions as those used in the previous embodiment are provided with identical reference signs, and their descriptions are omitted in this embodiment.

The embodiment described above deals with a case in which a voltage of an AC drive is applied to each of the first common electrodes 11 and the second common electrodes 12, which voltage of the AC drive varies every one horizontal scanning period. The present embodiment however applies the voltage of the AC drive to each of the first common electrodes 11 and second common electrodes 12, which voltage of the AC drive varies every one frame.

Figure 6:
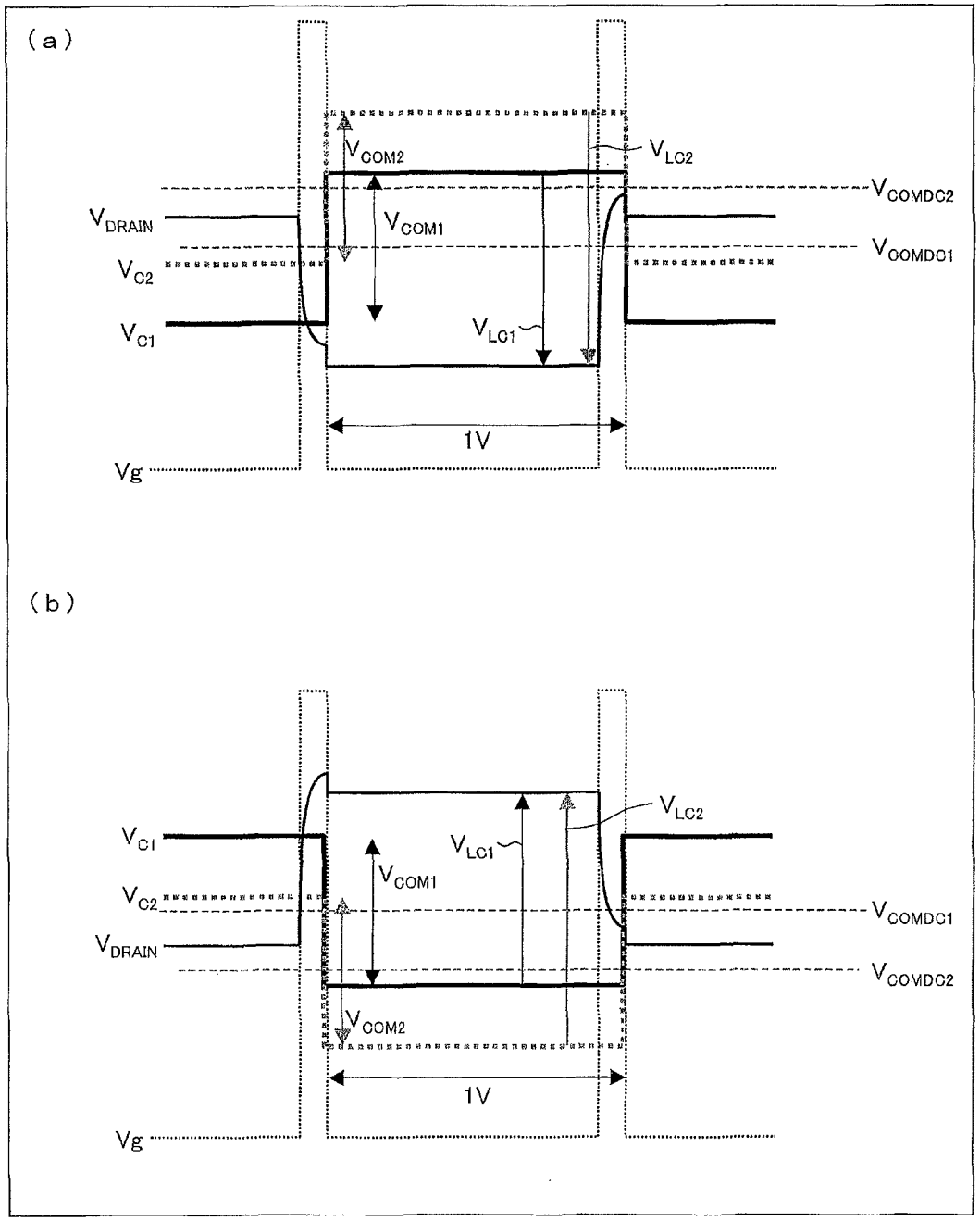
FIG. 6 is a timing chart of voltages in another embodiment of the present invention; (a) shows a case in a negative polarity and (b) shows a case in a positive polarity.

FIG. 6 is a view illustrating a behavior of a voltage applied to the electrodes in a case in which the first common electrode voltage $V_{C1}$ and the second common electrode voltage $V_{C2}$ are each a voltage of the AC drive that varies every one frame. Illustrated in (a) of FIG. 6 is a case in which the voltages $V_{LC1}$ and $V_{LC2}$ applied to the liquid crystal layer is negative (of a negative polarity), and illustrated in (b) of FIG. 6 is a case in which the voltages $V_{LC1}$ and $V_{LC2}$ applied to the liquid crystal layer is positive (of a positive polarity). Moreover, as illustrated in (a) and (b) of FIG. 6, the magnitude of the center voltages $V_{COMDC1}$ and $V_{COMDC2}$ are replaced with each other between the positive polarity and the negative polarity. Note that the drain voltage $V_{DRAIN}$ is subjected to a feed-through phenomenon.

In this case, the difference between the effective value $V_{LC1E}$ of the voltage applied to the liquid crystal layer in the subpixel 16a and the effective value $V_{LC2E}$ of the voltage applied to the liquid crystal layer in the subpixel 16b serves as a difference between the voltages $V_{LC1}$ and $V_{LC2}$ applied to the liquid crystal layer in each of the frames, and is, in both the positive polarity and the negative polarity, $$|V_{COMDC1} - V_{COMDC2}|.$$

Accordingly, even in a case in which the voltage of the AC drive that change every one frame is applied to each of the first common electrodes 11 and second common electrodes 12, the difference between the voltages applied to the subpixels becomes greater than the difference in a case in which the center voltages of the common electrode voltages applied to the common electrodes are in common. Hence, as compared to the liquid crystal display device in which the center voltages of the common electrode voltages applied to the common electrodes are in common, the liquid crystal display device becomes more excellent in its viewing angle characteristics.

Moreover, in a case in which the magnitudes of the center voltages $V_{COMDC1}$ and $V_{COMDC2}$ are replaced with each other between the positive polarity and the negative polarity, and the data signal is inversed with respect to an average of the center voltages, the voltage applied to the liquid crystal layer of the subpixel of the positive polarity has a same magnitude but is opposite in orientation to the voltage applied to the liquid crystal layer of the subpixel of the negative polarity. Hence, it is possible to prevent the image sticking of the liquid crystal layer in the subpixels.

Described below is another embodiment of the liquid crystal display device 1 according to the present invention, with reference to FIG. 7. For convenience in description, members having identical functions as those used in the previous embodiments are provided with identical reference signs, and their descriptions are omitted in the present embodiment.

The embodiment described above deals with the case in which the first common electrode voltage $V_{C1}$ and the second common electrode voltage $V_{C2}$ are each a voltage for AC drive; the present embodiment has each of the first common electrode voltage $V_{C1}$ and second common electrode voltage $V_{C2}$ be a voltage for DC drive.

Figure 7:
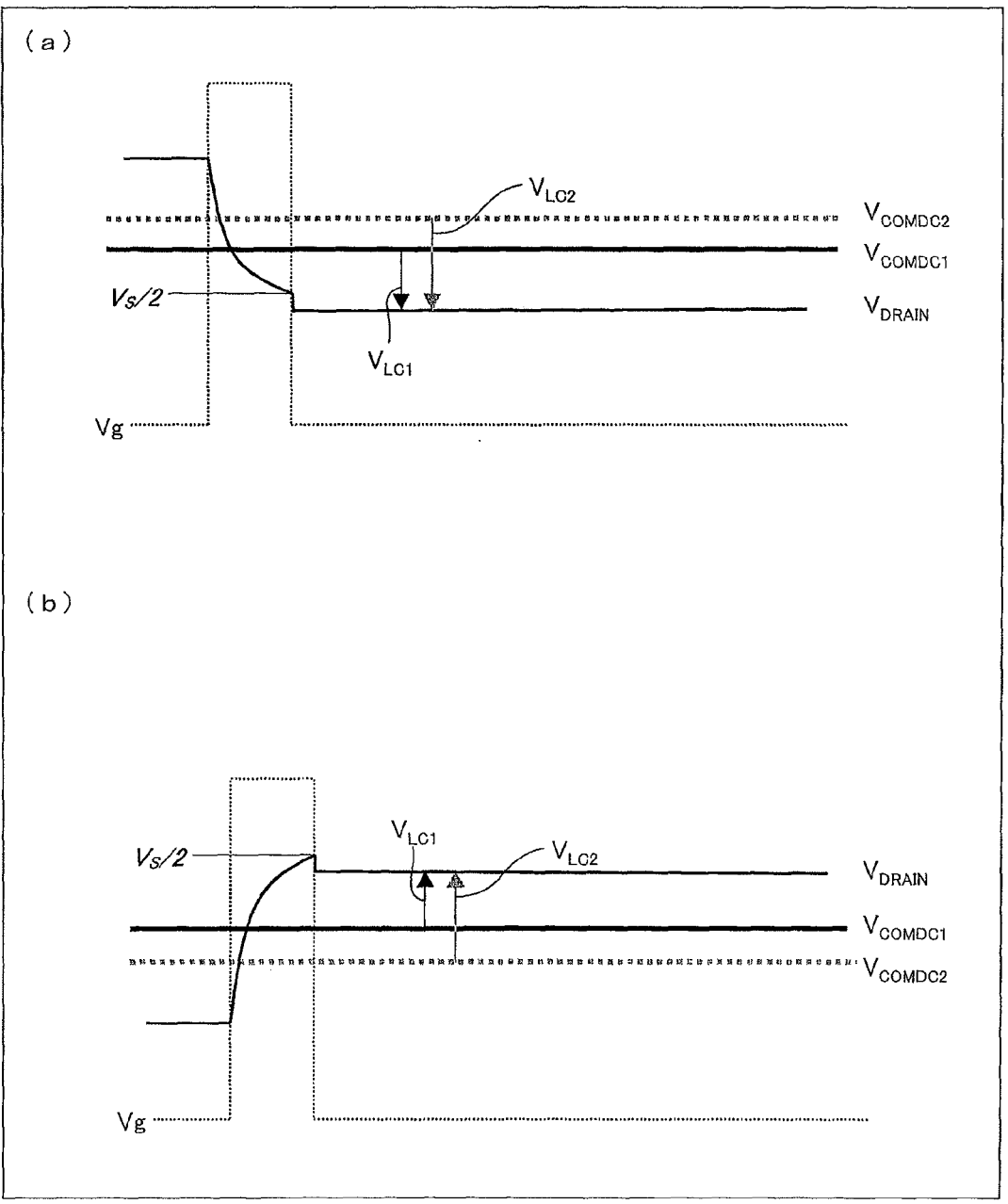
FIG. 7 is a timing chart of voltages in yet another embodiment of the present invention; (a) shows a case in a negative polarity and (b) shows a case in a positive polarity.

FIG. 7 is a view illustrating a behavior of a voltage applied to the electrodes in the case in which each of the first common electrode voltage $V_{C1}$ applied to the first common electrode 11 and the second common electrode voltage $V_{C2}$ applied to the second common electrode 12 are a DC voltage. In a case in which the common electrode voltages are driven by DC, the magnitudes of the first common electrode voltage $V_{C1}$ and the second common electrode voltage $V_{C2}$ are each of the same values as the center voltages $V_{COMDC1}$ and $V_{COMDC2}$, respectively. In the present embodiment, the data signal voltage is of a dot-inversion drive, however it is not limited to this. Illustrated in (a) of FIG. 7 is a case in which the voltage applied to the liquid crystal layer is negative (negative polarity), and illustrated in (b) of FIG. 7 is a case in which the voltage applied to the liquid crystal layer is positive (positive polarity). Moreover, as illustrated in (a) and (b) of FIG. 7, the magnitudes of the center voltages $V_{COMDC1}$ and $V_{COMDC2}$ are replaced with each other between the positive polarity and the negative polarity. Note that the drain voltage $V_{DRAIN}$ is subjected to the feed-through phenomenon.

In this case also, the difference between the effective voltage $V_{LC1E}$ applied to the liquid crystal layer in the subpixel 16a and the effective voltage $V_{LC2E}$ applied to the liquid crystal layer in the subpixel 16b serves as the difference between the voltages $V_{LC1}$ and $V_{LC2}$ applied to the liquid crystal layers in the dots, and becomes, in either of the positive polarity and negative polarity, $$|V_{COMDC1} - V_{COMDC2}|.$$

Hence, even in the case in which each of the voltages applied to the first common electrodes 11 and the second common electrodes 12 are of the DC voltage, the difference between the voltages applied to the subpixels is greater than the difference of that in the case in which the center voltages of the common electrode voltages applied to the common electrodes are in common. Hence, as compared to the liquid crystal display device in which the center voltages of the common electrode voltage applied to the common electrodes are in common, the liquid crystal display device has a more excellent viewing angle characteristic.

Moreover, in a case in which the magnitudes of the center voltages $V_{COMDC1}$ and $V_{COMDC2}$ are replaced with each other between the positive polarity and the negative polarity, and the data signal is inverted with respect to the average of the center voltages, the voltage applied to the liquid crystal layer in the subpixel of the positive polarity is a voltage having a same magnitude but with an opposite orientation to the voltage applied to the liquid crystal layer in the subpixel of the negative polarity. Hence, it is possible to prevent the image sticking on the liquid crystal layer in the subpixels.

Described below is another embodiment of the liquid crystal display device 1 according to the present invention, with reference to FIG. 8. For convenience in explanation, members having identical functions as those used in the previous embodiments are provided with identical reference signs, and their descriptions have been omitted.

The embodiment described above deals with a case in which the center voltage $V_{COMDC1}$ of the first common electrode voltage $V_{C1}$ is replaced with the center voltage $V_{COMDC2}$ of the second common electrode voltage $V_{C2}$ every one frame; the liquid crystal display device 1 of the present embodiment is driven so that the center voltages are replaced with each other every two frames.

Figure 8:
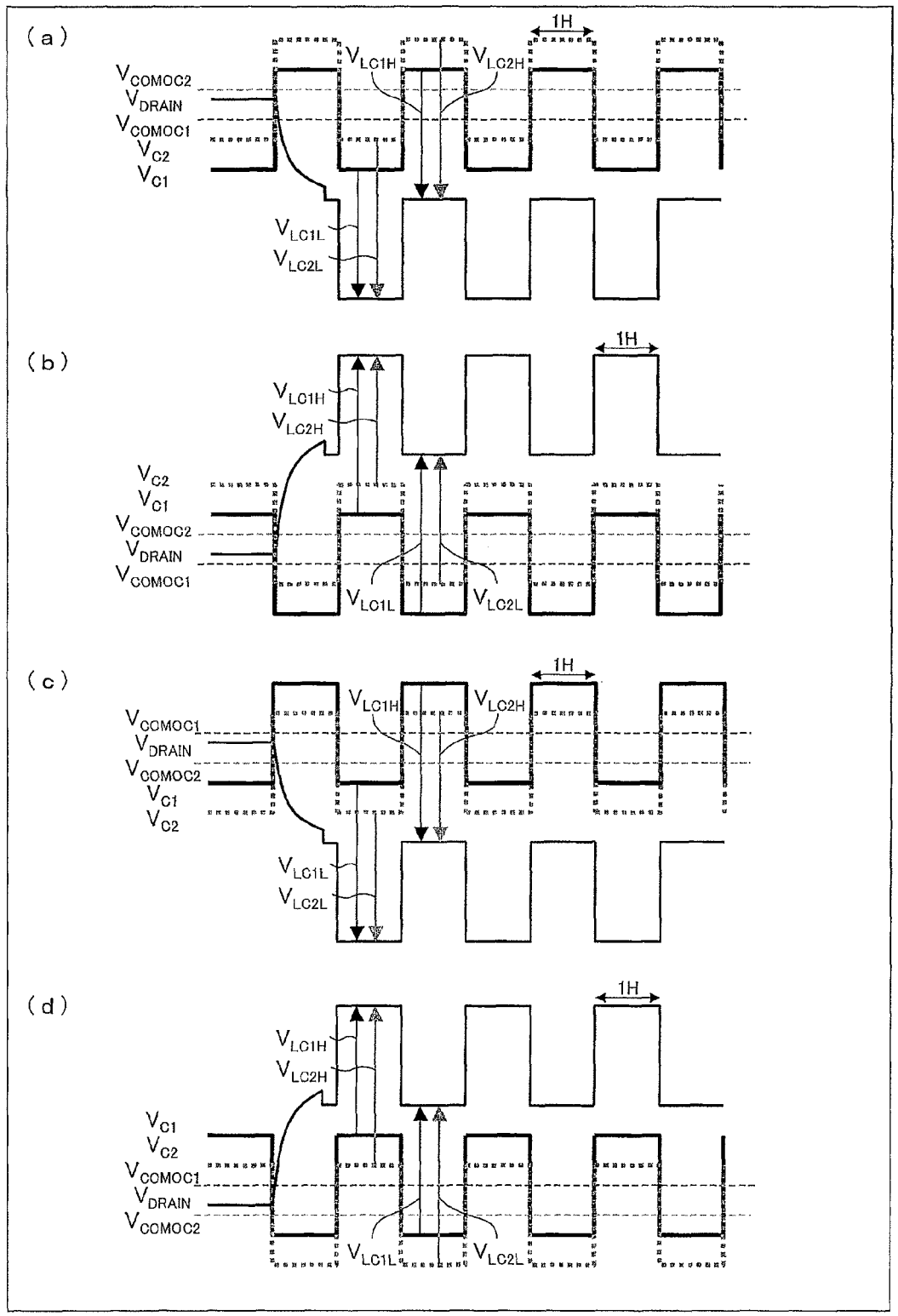
FIG. 8 is a timing chart of voltages in yet another embodiment of the present invention, and (a) through (d) show time charts of different frames.

FIG. 8 is a view illustrating a behavior of the voltages in a case in which the center voltage $V_{COMDC1}$ of the first common electrode voltage $V_{C1}$ and the center voltage $V_{COMDC2}$ of the second common electrode potential $V_{C2}$ are replaced with each other every two frames.

When transferring from a first frame (odd frame) ((a) of FIG. 8) showing negative polarity to a subsequent second frame (even frame) ((b) of FIG. 8), the drain voltage $V_{DRAIN}$ is reversed, and its polarity is changed to a positive polarity. However at this stage, the $V_{COMDC1}$ and $V_{COMDC2}$ are not changed. Namely, the center voltages have not been replaced with each other between the first frame and the subsequent second frame. When transferring from the second frame to the subsequent third frame (odd frame) ((c) of FIG. 8), the polarity again is reversed to the positive polarity. Moreover, when transferring to the third frame, the $V_{COMDC1}$ and $V_{COMDC2}$ are replaced with each other at a same timing as the reversal of the polarity. When transferring from the third frame to the subsequent fourth frame (even frame) ((d) of FIG. 8), the polarity is again reversed to the negative polarity. However at this stage, the $V_{COMDC1}$ and the $V_{COMDC2}$ have not changed yet. Namely, the center voltages have not been replaced with each other between the third frame and the fourth frame. That is to say, the value of the $V_{COMDC1}$ and $V_{COMDC2}$ are the same values in the third frame and in the fourth frame.

As such, even in a case in which the replacing of the $V_{COMDC1}$ and $V_{COMDC2}$ are carried out every two frames, a final difference between the effective voltage $V_{LC1E}$ in the liquid crystal layer of the subpixel 16a and the effective voltage VLC2E in the liquid crystal layer of the subpixel 16b is $$|V_{COMDC1} - V_{COMDC2}|.$$

Hence, even in the case in which the $V_{COMDC1}$ and $V_{COMDC2}$ are replaced with each other every two frames, the difference between the voltage applied to the subpixels is larger than the difference between the voltages applied to the subpixels in a case in which the center voltages of the common electrode voltages applied to the common electrodes are in common. Accordingly, the liquid crystal display device has more excellent viewing angle characteristics as compared to a liquid crystal display device in which the center voltages of the common electrode voltages applied to the common electrodes are in common.

Furthermore, in a case in which $V_{COMDC1}$ and $V_{COMDC2}$ are replaced with each other every two frames, an effect is attained that electricity consumption is reduced as compared to the case in which the $V_{COMDC1}$ and $V_{COMDC2}$ are replaced with each other every one frame or every one line.

The present invention is not limited to the description of the embodiments above, but may be altered by a skilled person within the scope of the claims. An embodiment based on a proper combination of technical means disclosed in different embodiments is encompassed in the technical scope of the present invention.

It is preferable that the liquid crystal display device according to the present invention includes: data signal voltage application means for applying a data signal voltage to each of the plurality of pixel electrodes; and control means for controlling the application of the common electrode voltages to the respective common electrodes by the first common electrode voltage application means and the second common electrode voltage application means, the data signal voltage application means applying a data signal voltage to each of the plurality of pixel electrodes, the data signal voltage being reversed in polarity at an average of the first center voltage and the second center voltage, and the control means controlling the first common electrode voltage application means and the second common electrode voltage application means so that the first common electrode voltage application means and the second common electrode voltage application means apply, at a preset timing, common electrode voltages whose value of the first center voltage and value of the second center voltage are replaced with each other.

According to the configuration, a voltage applied to a liquid crystal layer in accordance with a data signal voltage which has not been reversed in its polarity and a first common electrode voltage including the first center voltage is a voltage having a same magnitude but with a different polarity to a voltage applied to the liquid crystal layer by the data signal voltage which has been reversed in polarity and by the first common electrode voltage including the first center voltage with which the second center voltage has been replaced.

Hence, a voltage being same in its magnitude but opposite in positive and negative polarity is applied to the liquid crystal layer every fixed time. This allows for preventing image sticking of the liquid crystal layer.

In a case in which a feed-through phenomenon of the data signal voltage is taken into consideration, it is preferable that the liquid crystal display device according to the present invention includes: data signal voltage application means for applying a data signal voltage to the pixel electrodes; and control means for controlling the application of the common electrode voltages to the respective common electrodes by the first common electrode voltage application means and the second common electrode voltage application means, the data signal voltage application means applying a data signal voltage to each of the plurality of pixel electrodes, the data signal voltage being reversed in polarity at a value greater than an average of the first center voltage and the second center voltage by a value of a feed-through voltage, and the control means controlling the first common electrode voltage application means and the second common electrode voltage application means so that the first common electrode voltage application means and the second common electrode voltage application means apply, at a preset timing, common electrode voltages whose value of the first center voltage and value of the second center voltage are replaced with each other.

According to the configuration, even after occurrence of the feed-through phenomenon, a voltage having a same magnitude but with opposite positive and negative polarities is applied to the liquid crystal layer every fixed time. This allows for preventing the image sticking on the liquid crystal layer.

Moreover, in the liquid crystal display device according to the present invention, the first common electrode voltage and the second common electrode voltage may be each a voltage for AC drive.

At this time, it is preferable that the first common electrode voltage has an amplitude with a magnitude same as a magnitude of an amplitude of the second common electrode voltage.

According to the configuration, the difference between the voltage applied to the first area and the voltage applied to the second area is the same between a case in which the amplitude of the common electrode voltages is Low and a case in which the amplitude of the common electrode voltages is High. Hence, it is possible to have a uniform viewing angle improvement effect in one dot, one line, or one frame.

Moreover, it is preferable that the liquid crystal display device according to the present invention further includes a storage capacitor electrode that forms a storage capacitor with the pixel electrodes, the storage capacitor electrode being applied a voltage so that a degree of change in the data signal voltage caused by a change in the first common electrode voltage is made to be identical to the magnitude of the amplitude of the first common electrode voltage, and that a degree of change in the data signal voltage caused by a change in the second common electrode voltage is made to be identical to the magnitude of the amplitude of the second common electrode voltage.

According to the configuration, it is possible to have the first common electrode voltage and the second common electrode voltage be constant in its application voltage, in a High timing and in a Low timing.

The present invention is suitably used in various apparatuses that utilize a liquid crystal display device in a display section, such as a television and a portable phone.

REFERENCE SIGNS LIST 1 liquid crystal display device
11 first common electrode
12 second common electrode
14 drain electrode
16 pixel
16a, 16b subpixel

The invention claimed is:

1. A liquid crystal display device comprising:
an active matrix substrate including a plurality of pixel electrodes that are disposed in a matrix form;
a counter substrate including a plurality of common electrodes;
a liquid crystal layer being sandwiched between the active matrix substrate and the counter substrate, each of the plurality of pixel electrodes facing at least two common electrodes, one common electrode of the at least two common electrodes facing the respective pixel electrode serving as a first common electrode and another common electrode other than the first common electrode serving as a second common electrode;
a first common electrode voltage application unit for applying, to the first common electrode, a first common electrode voltage that includes a center voltage as a first center voltage, the center voltage being the voltage thus applied in a case of DC drive and being a value in midpoint of an amplitude of the voltage thus applied in a case of AC drive;
a second common electrode voltage application unit for applying, to the second common electrode, a second common electrode voltage that includes a second center voltage, the second center voltage being the center voltage of a different value from that of the first center voltage;

a data signal voltage application unit for applying a data signal voltage to each of the plurality of pixel electrodes; and a control unit for controlling the application of the common electrode voltages to the respective common electrodes by the first common electrode voltage application unit and the second common electrode voltage application unit, the data signal voltage application unit applying a data signal voltage to each of the plurality of pixel electrodes, the data signal voltage being reversed in polarity at an average of the first center voltage and the second center voltage, and the control unit controlling the first common electrode voltage application unit and the second common electrode voltage application unit so that the first common electrode voltage application unit and the second common electrode voltage application unit apply, at a preset timing, common electrode voltages whose value of the first center voltage and value of the second center voltage are replaced with each other.

2. The liquid crystal display device according to claim 1, wherein the first common electrode voltage and the second common electrode voltage are each a voltage for AC drive.

3. The liquid crystal display device according to claim 2, wherein the first common electrode voltage has an amplitude with a magnitude same as a magnitude of an amplitude of the second common electrode voltage.

4. The liquid crystal display device according to claim 3, further comprising a storage capacitor electrode that forms a storage capacitor with the pixel electrodes, the storage capacitor electrode being applied a voltage so that a degree of change in the data signal voltage caused by a change in the first common electrode voltage is made to be identical to the magnitude of the amplitude of the first common electrode voltage, and that a degree of change in the data signal voltage caused by a change in the second common electrode voltage is made to be identical to the magnitude of the amplitude of the second common electrode voltage.

5. A liquid crystal display device comprising:
an active matrix substrate including a plurality of pixel electrodes that are disposed in a matrix form;
a counter substrate including a plurality of common electrodes;
a liquid crystal layer being sandwiched between the active matrix substrate and the counter substrate, each of the plurality of pixel electrodes facing at least two common electrodes, one common electrode of the at least two common electrodes facing the respective pixel electrode serving as a first common electrode and another common electrode other than the first common electrode serving as a second common electrode;
a first common electrode voltage application unit for applying, to the first common electrode, a first common electrode voltage that includes a center voltage as a first center voltage, the center voltage being the voltage thus applied in a case of DC drive and being a value in midpoint of an amplitude of the voltage thus applied in a case of AC drive;
a second common electrode voltage application unit for applying, to the second common electrode, a second common electrode voltage that includes a second center voltage, the second center voltage being the center voltage of a different value from that of the first center voltage;

a data signal voltage application unit for applying a data signal voltage to the pixel electrodes; and a control unit for controlling the application of the common electrode voltages to the respective common electrodes by the first common electrode voltage application unit and the second common electrode voltage application unit, the data signal voltage application unit applying a data signal voltage to each of the plurality of pixel electrodes, the data signal voltage being reversed in polarity at a value greater than an average of the first center voltage and the second center voltage by a value of a feed-through voltage, and the control unit controlling the first common electrode voltage application unit and the second common electrode voltage application unit so that the first common electrode voltage application unit and the second common electrode voltage application unit apply, at a preset timing, common electrode voltages whose value of the first center voltage and value of the second center voltage are replaced with each other.

6. The liquid crystal display device according to claim 5, wherein the first common electrode voltage and the second common electrode voltage are each a voltage for AC drive.

7. The liquid crystal display device according to claim 6, wherein the first common electrode voltage has an amplitude with a magnitude same as a magnitude of an amplitude of the second common electrode voltage.

8. The liquid crystal display device according to claim 7, further comprising a storage capacitor electrode that forms a storage capacitor with the pixel electrodes, the storage capacitor electrode being applied a voltage so that a degree of change in the data signal voltage caused by a change in the first common electrode voltage is made to be identical to the magnitude of the amplitude of the first common electrode voltage, and that a degree of change in the data signal voltage caused by a change in the second common electrode voltage is made to be identical to the magnitude of the amplitude of the second common electrode voltage.

9. A liquid crystal display device comprising:
an active matrix substrate including a plurality of pixel electrodes that are disposed in a matrix form;
a counter substrate including a plurality of common electrodes;
a liquid crystal layer being sandwiched between the active matrix substrate and the counter substrate, each of the plurality of pixel electrodes facing at least two common electrodes, one common electrode of the at least two common electrodes facing the respective pixel electrode serving as a first common electrode and another common electrode other than the first common electrode serving as a second common electrode;
a first common electrode voltage application unit for applying, to the first common electrode, a first common electrode voltage that includes a center voltage as a first center voltage, the center voltage being the voltage thus applied in a case of DC drive and being a value in midpoint of an amplitude of the voltage thus applied in a case of AC drive;
a second common electrode voltage application unit for applying, to the second common electrode, a second common electrode voltage that includes a second center voltage, the second center voltage being the center voltage of a different value from that of the first center voltage, the first common electrode voltage and the second common electrode voltage being each a voltage for AC drive, the first common electrode voltage having an amplitude with a magnitude same as a magnitude of an amplitude of the second common electrode voltage; and a storage capacitor electrode that forms a storage capacitor with the pixel electrodes, the storage capacitor electrode being applied a voltage so that a degree of change in the data signal voltage caused by a change in the first common electrode voltage is made to be identical to the magnitude of the amplitude of the first common electrode voltage, and that a degree of change in the data signal voltage caused by a change in the second common electrode voltage is made to be identical to the magnitude of the amplitude of the second common electrode voltage.

* * * * *